(12) United States Patent
Kitazato

(10) Patent No.: US 10,771,175 B2
(45) Date of Patent: *Sep. 8, 2020

(54) RECEIVING APPARATUS, RECEIVING METHOD, TRANSMITTING APPARATUS, AND TRANSMITTING METHOD

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,920

(22) Filed: Mar. 27, 2019

(65) Prior Publication Data

US 2019/0222333 A1    Jul. 18, 2019

Related U.S. Application Data

(63) Continuation of application No. 15/129,034, filed as application No. PCT/JP2015/001907 on Apr. 3, 2015, now Pat. No. 10,291,341.

(30) Foreign Application Priority Data

Apr. 4, 2014   (JP) .................................. 2014-078032

(51) Int. Cl.
*H04H 60/13* (2008.01)
*H04L 29/06* (2006.01)
*H04H 20/93* (2008.01)

(52) U.S. Cl.
CPC ......... *H04H 60/13* (2013.01); *H04L 65/4076* (2013.01); *H04L 65/607* (2013.01); *H04L 65/608* (2013.01); *H04H 20/93* (2013.01)

(58) Field of Classification Search
CPC ... H04L 60/13; H04L 65/4076; H04L 65/608; H04L 65/607
See application file for complete search history.

(56) References Cited

U.S. PATENT DOCUMENTS 7,761,591 B2 *   7/2010   Graham ................. G06Q 40/02
                                                         709/204
10,291,341 B2 *  5/2019   Kitazato ............... H04L 65/607
(Continued)

FOREIGN PATENT DOCUMENTS

CN           1913373 A      2/2007
CN         103262549 A      8/2013
(Continued)

OTHER PUBLICATIONS

International Search Report dated Jul. 8, 2015 in PCT/JP2015/001907, filed Apr. 3, 2015.
(Continued)

*Primary Examiner* — El Hadji M Sall
(74) *Attorney, Agent, or Firm* — Oblon, McClelland, Maier & Neustadt, L.L.P.

(57) ABSTRACT

A receiving apparatus includes circuitry configured to receive a digital broadcast signal which uses an internet protocol (IP) transfer method. Based on control information included in the digital broadcast signal, the circuitry acquires at least one of a broadcast component or a communication component, and controls an operation of each section which performs a predetermined process relating to the acquired at least one component. The broadcast component and the communication component are associated with a component hierarchy including a first hierarchy level, a second hierarchy level, and a third hierarchy level for each component category.

20 Claims, 25 Drawing Sheets

| Video/Audio/Closed Caption | | NRT Content | ESG | SCS | |
|---|---|---|---|---|---|
| RTP | fMP4 | | | | LLS |
| | | FLUTE/ALS | | | |
| UDP | | | | | |
| IP | | | | | BBP Stream |
| PHY | | | | | |

(56) References Cited

U.S. PATENT DOCUMENTS

| | | | |
|---|---|---|---|
| 2006/0129441 A1* | 6/2006 | Yankovich | G06Q 10/063114 705/7.15 |
| 2007/0252834 A1* | 11/2007 | Fay | G06T 3/4092 345/428 |
| 2010/0220818 A1* | 9/2010 | Yamamoto | H04H 20/42 375/340 |
| 2013/0182643 A1 | 7/2013 | Pazos et al. | |
| 2014/0325572 A1 | 10/2014 | Yie et al. | |
| 2015/0229966 A1 | 8/2015 | Choe | |

FOREIGN PATENT DOCUMENTS

| | | |
|---|---|---|
| JP | 2011-66556 A | 3/2011 |
| JP | 2013-157820 A | 8/2013 |
| JP | 2013-243637 A | 12/2013 |
| KR | 10-2013-0058648 A | 6/2013 |
| WO | WO 2012/099359 A2 | 7/2012 |
| WO | WO 2013/077698 A1 | 5/2013 |

OTHER PUBLICATIONS

Office Action dated Mar. 13, 2018 in corresponding Japanese Patent Application No. 2014-078032 (with English Translation), 8 pages.
Shuichi Aoki et al., "A Study on MMT for Hybrid Delivery on Broadcast and Broadband", Information Processing Society of Japan, vol. 2014-AVM-84, No. 2, Feb. 2014, pp. 1-6 and cover pages.

\* cited by examiner

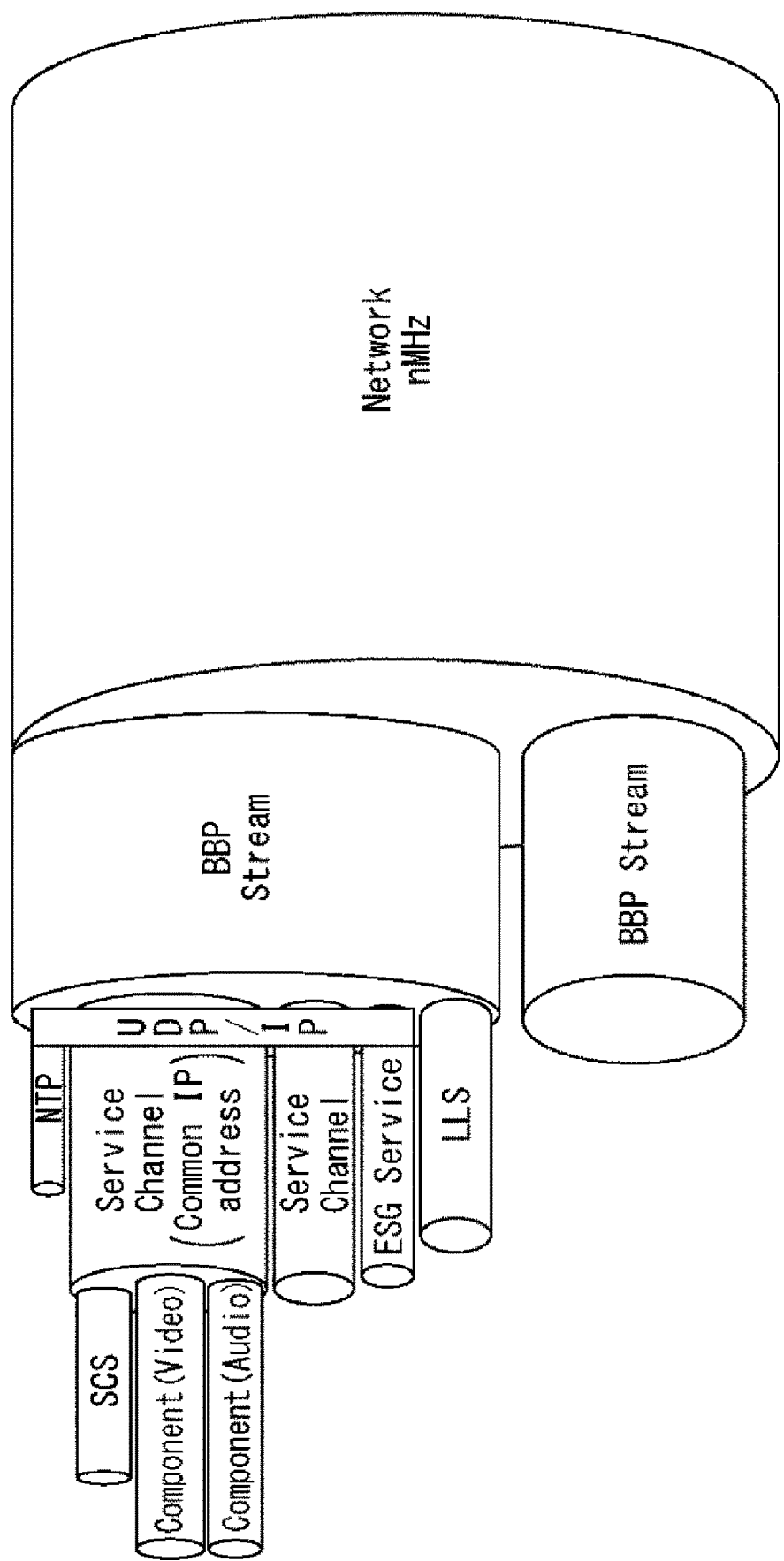

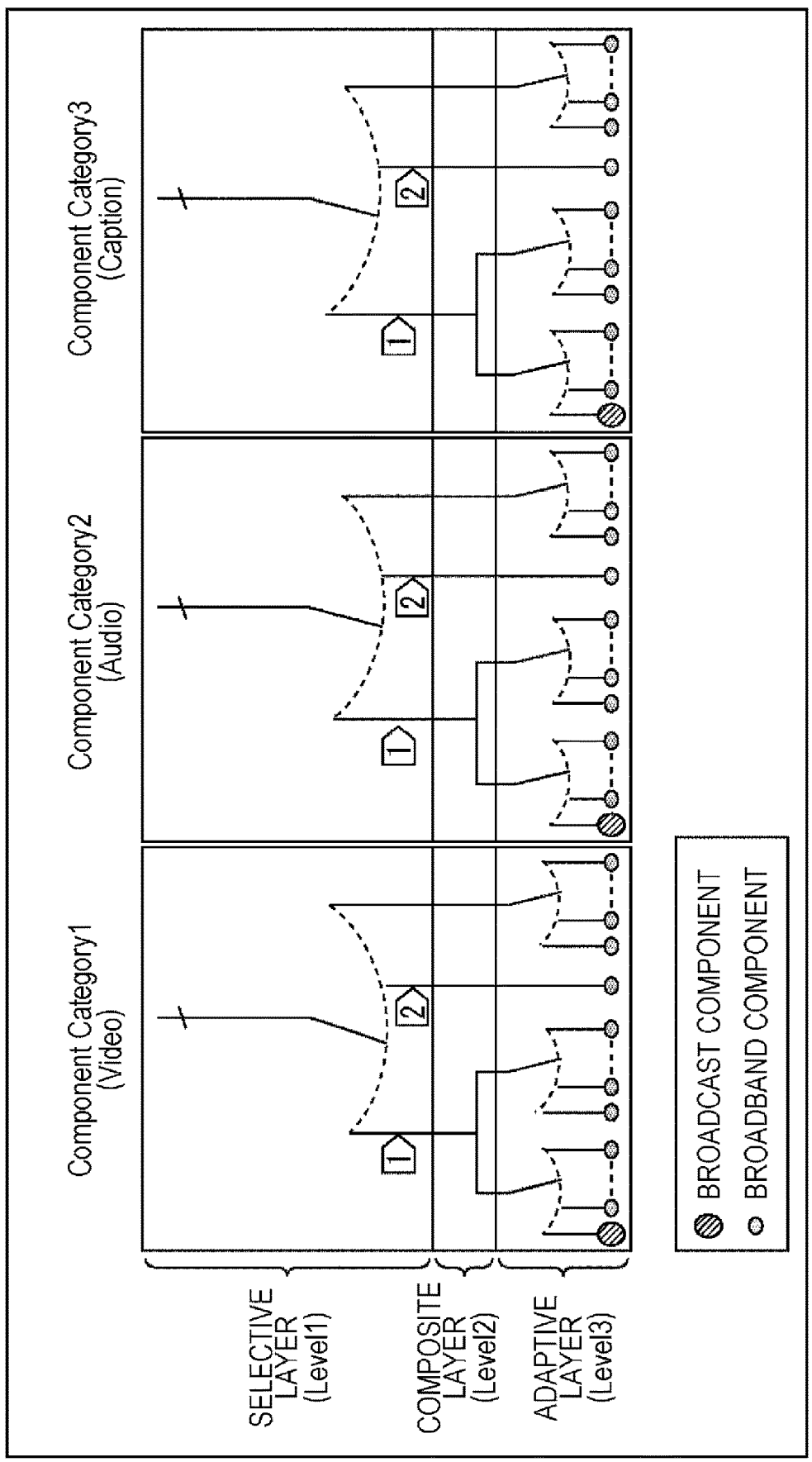

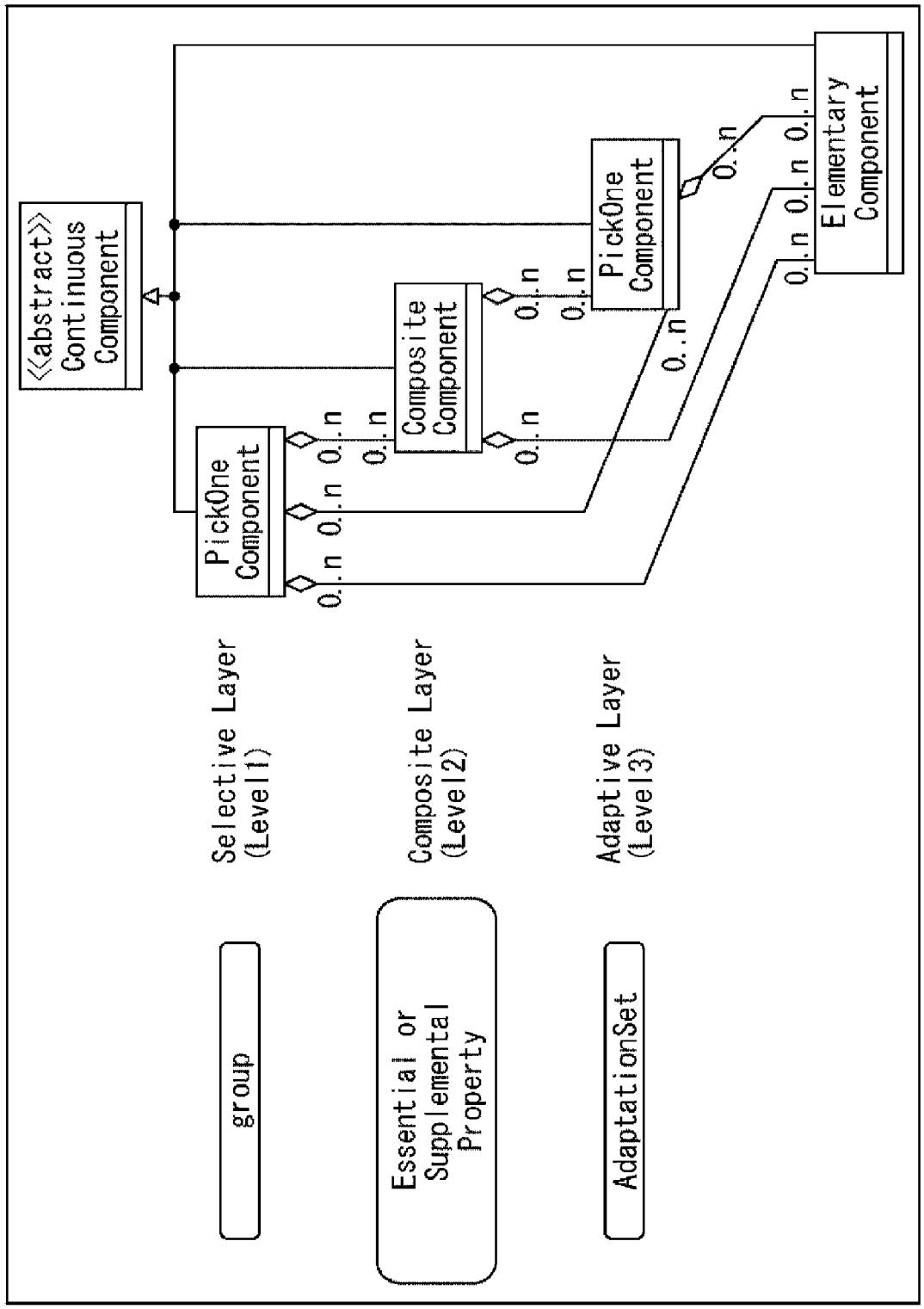

FIG. 6

| | NUMBER OF OCCURRENCES | |
|---|---|---|
| @topAttribute | 1..m0 | ATTRIBUTE FOR FINAL SELECTION (m0 TYPE) |
| SelectiveComponentGroup | 1..n1 | FIXED SELECTION TARGET COMPONENT GROUP |
| @selectiveAttribute1..m1 | 0..m1 | FIXED SELECTION TARGET ATTRIBUTE (m1 TYPE) |
| CompositeComponentGroup | 1..n2 | COMPOSITE TARGET COMPONENT GROUP |
| @compositeAttribute1..m2 | 0..m2 | COMPOSITE TARGET ATTRIBUTE (m2 TYPE) |
| AdaptiveComponent | 1..n3 | (ADAPTIVE SELECTION TARGET) COMPONENT |
| @adaptiveAttribute1..m3 | 0..m3 | ADAPTIVE SELECTION TARGET ATTRIBUTE (m3 TYPE) |
| @componentId | 1 | COMPONENT ID |

FIG. 15

| Element/Attribute(with@) | Cardinality | Description |
|---|---|---|
| Spd | 1 | Service parameter description |
|   @serviceId | 1 | service identifier (major+minor) |
|   @spIndicator | 0..1 | Service protection off/on |
|   ComponentLayerDescriptor | 0..1 | Component Layer structure |
|   ProtocolVersionDescriptor | 0..1 | Data transmission protocol type&version |
|   NRTServiceDescriptor | 0..1 | NRT service configuration |
|   CapabilityDescriptor | 0..1 | Receiver capability to be required |
|   IconDescriptor | 0..1 | Icon location for NRT service |
|   ISO639LanguageDescriptor | 0..1 | Language for NRT service |
|   ReceiverTargetingDescriptor | 0..1 | Targeting information |
|   AssociatedServiceDescriptor | 0..1 | Pointer to its associated service |
|   ContentAdvisoryDescriptor | 1 | Rating information |
|   Component | 1..n | Component signal (Elementary Stream) |
|     @componentId | 1 | Component identification (Identical to representation_id of MPD) |
|     @representationId | 0..1 | MPD representation id |
|     @subRepresentationLevel | 0..1 | MPD sub-representation level |
|     @componentCategory | 0..1 | Component Category "video", "audio", "caption", "nrt" |
|     @locationType | 0..1 | Component Location type "bb", "bca", "bco" |
|     @componentEncription | 0..1 | Component level encryption "on", "off" |
|     @compositePosition | 0..1 | Composite type position (scalable video case ⇒ "base" / "enhancement") |
|     @targetedScreen | 0..m | Target device indication "primary" / "secondary" |
|     ContentAdvisoryDescriptor | 0..1 | Rating information |
|     AVCVideoDescriptor | 0..1 | Video parameters in case of AVC |
|     HEVCVideoDescriptor | 0..1 | Video parameters in case of HEVC |
|     MPEG4AACAudioDescriptor | 0..1 | Audio parameters in case of MPEG4-AAC |
|     AC3AudioDescriptor | 0..1 | Audio parameters in case of AC3 |
|     CaptionDescriptor | 0..1 | Closed Caption parameters |

FIG. 16

| Element/Attribute (with@) | Cardinality | Description |
|---|---|---|
| ComponentLayerDescriptor | | |
|   ComponentCategory | 1..n | COMPONENT CATEGORY |
|     @category | 1 | CATEGORY NAME (video/audio/caption/NRT) |
|     @mpdGroupId | 0..1 | CORRESPONDING MPD GROUP ID |
|   ComponentGroup | 1..m | COMPONENT GROUP |
|     @id | 1 | COMPONENT GROUP ID |
|     @adaptationSetId | 0..1 | CORRESPONDING MPD Adaptation Set ID |
|     @defaultFlag | 0..1 | CASE 1 SELECTED BY DEFAULT |
|     @muxId | 0..n | COMBINATION ID BETWEEN DIFFERENT COMPONENT CATEGORIES (SAME ID WITH RESPECT TO MPD Subset COMBINATION) |
|     @encryption | 0..1 | ENCRYPTED CASE 1 |
|     @language | 0..1 | LANGUAGE |
|     @compositeType | 0..1 | COMPOSITE TYPE (none/scalable/mix/tile···) |
|     @usage | 0..1 | USAGE PURPOSE (vi/hi/narration/····) |
|     @stereoscope | 0..1 | 3D VIDEO CASE 1 |
|     @audioChannelConfig | 0..1 | AUDIO CHANNEL CONFIGURATION (Monoral/Stereo/5.1ch/22.1ch) |
|     @targetScreen | 0..1 | TARGET DEVICE DESIGNATION (primary/secondary) |
|     ViewPointDescriptor | 0..1 | VIEWPOINT (VIEW ID, VIEW TITLE NAME) |
|     ContentAdvisoryDescriptor | 0..1 | RATING INFORMATION |
|     componentId | 1..n | COMPONENT ID TO BE INCLUDED |

FIG. 17

| Element/Attribute (with@) | | | | Cardinality | Description |
|---|---|---|---|---|---|
| Spd | | | | 1 | Service parameter description |
| | @serviceId | | | 1 | service identifier (major+minor) |
| | @spIndicator | | | 0..1 | Service protection off/on |
| | ProtocolVersionDescriptor | | | 0..1 | Data transmission protocol type&version |
| | NRTServiceDescriptor | | | 0..1 | NRT service configuration |
| | CapabilityDescriptor | | | 0..1 | Receiver capability to be required |
| | IconDescriptor | | | 0..1 | Icon location for NRT service |
| | ISO639LanguageDescriptor | | | 0..1 | Language for NRT service |
| | ReceiverTargetingDescriptor | | | 0..1 | Targeting information |
| | AssociatedServiceDescriptor | | | 0..1 | Pointer to its associated service |
| | ContentAdvisoryDescriptor | | | 1 | Rating information |
| | ComponentCategoryGroup | | | 1..n | COMPONENT CATEGORY GROUP |
| | | @componentCategory | | 1 | COMPONENT CATEGORY (video/audio/caption/NRT) |
| | | @mpdGroupId | | 0..1 | CORRESPONDING MPD GROUP Id |
| | | ComponentGroup | | 1..m | COMPONENT GROUP |
| | | | @id | 1 | COMPONENT GROUP ID |
| | | | @adaptationSetId | 0..1 | CORRESPONDING MPD Adaptation Set ID |
| | | | @defaultFlag | 0..1 | CASE 1 SELECTED BY DEFAULT |
| | | | @muxId | 0...n | COMBINATION ID BETWEEN DIFFERENT COMPONENT CATEGORIES (SAME ID WITH RESPECT TO MPD Subset COMBINATION) |
| | | | @encryption | 0..1 | ENCRYPTED CASE 1 |
| | | | @language | 0..1 | LANGUAGE |
| | | | @compositeType | 0..1 | COMPOSITE TYPE (none/scalable/mix/tile···) |
| | | | @usage | 0..1 | USAGE PURPOSE (vi/hi/narration/·····) |
| | | | @stereoscope | 0..1 | 3D VIDEO CASE 1 |
| | | | @audioChannelConfig | 0..1 | AUDIO CHANNEL CONFIGURATION (Monoral/Stereo/5.1ch/22.1ch) |
| | | | @targetedScreen | 0..1 | TARGET DEVICE DESIGNATION (primary/secondary) |
| | | | ViewPointDescriptor | 0..1 | VIEWPOINT (VIEW ID, VIEW TITLE NAME) |
| | | | ContentAdvisoryDescriptor | 0..1 | RATING INFORMATION |
| | | | Component | 1..n | Component signal (Elementary Stream) |
| | | | | @componentId | 1 | Component identification (Identical to representation_id of MPD) |
| | | | | @representationId | 0..1 | MPD representation id |
| | | | | @subRepresentationLevel | 0..1 | MPD sub-representation level |
| | | | | @componentCategory | 0..1 | Component Category "video", "audio", "caption", "nrt" |
| | | | | @locationType | 0..1 | Component Location type "bb", "bca", "bco" |
| | | | | @compositePosition | 0..1 | Composite type position (scalable video case ⇒ "base" / "enhancement" ) |
| | | | | AVCVideoDescriptor | 0..1 | Video parameters in case of AVC |
| | | | | HEVCVideoDescriptor | 0..1 | Video parameters in case of HEVC |
| | | | | MPEG4AACAudioDescriptor | 0..1 | Audio parameters in case of MPEG4-AAC |
| | | | | AC3AudioDescriptor | 0..1 | Audio parameters in case of AC3 |
| | | | | CaptionDescriptor | 0..1 | Closed Caption parameters |

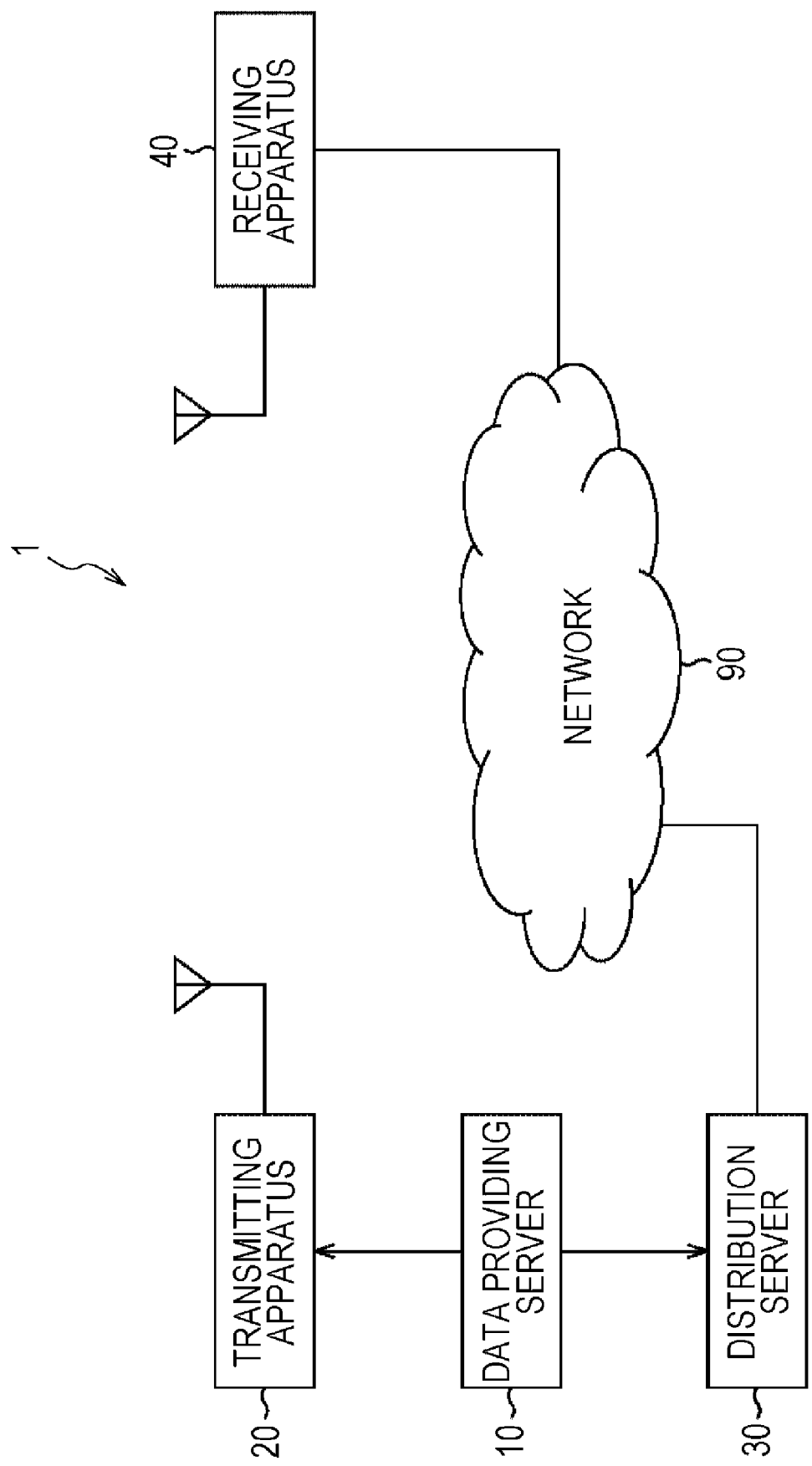

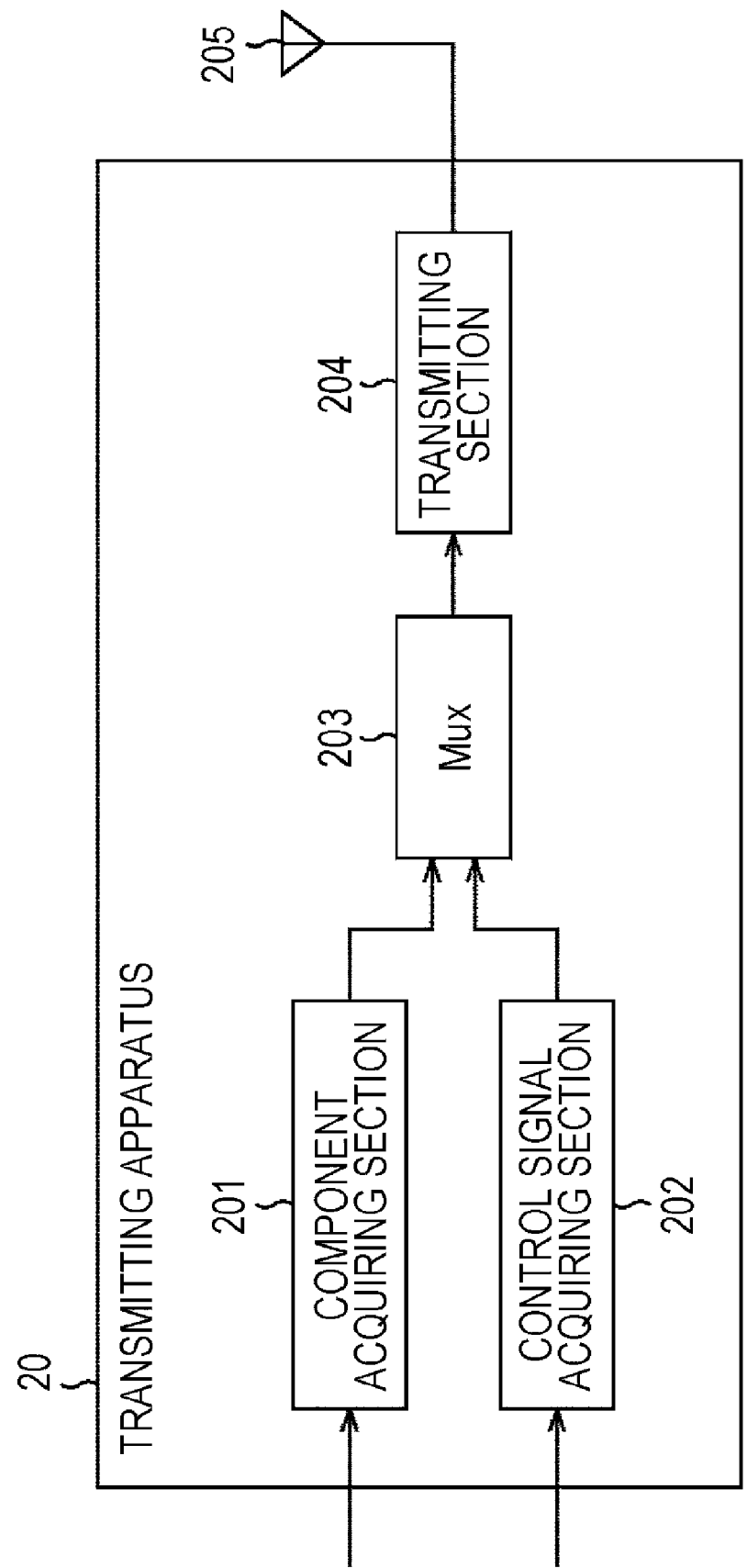

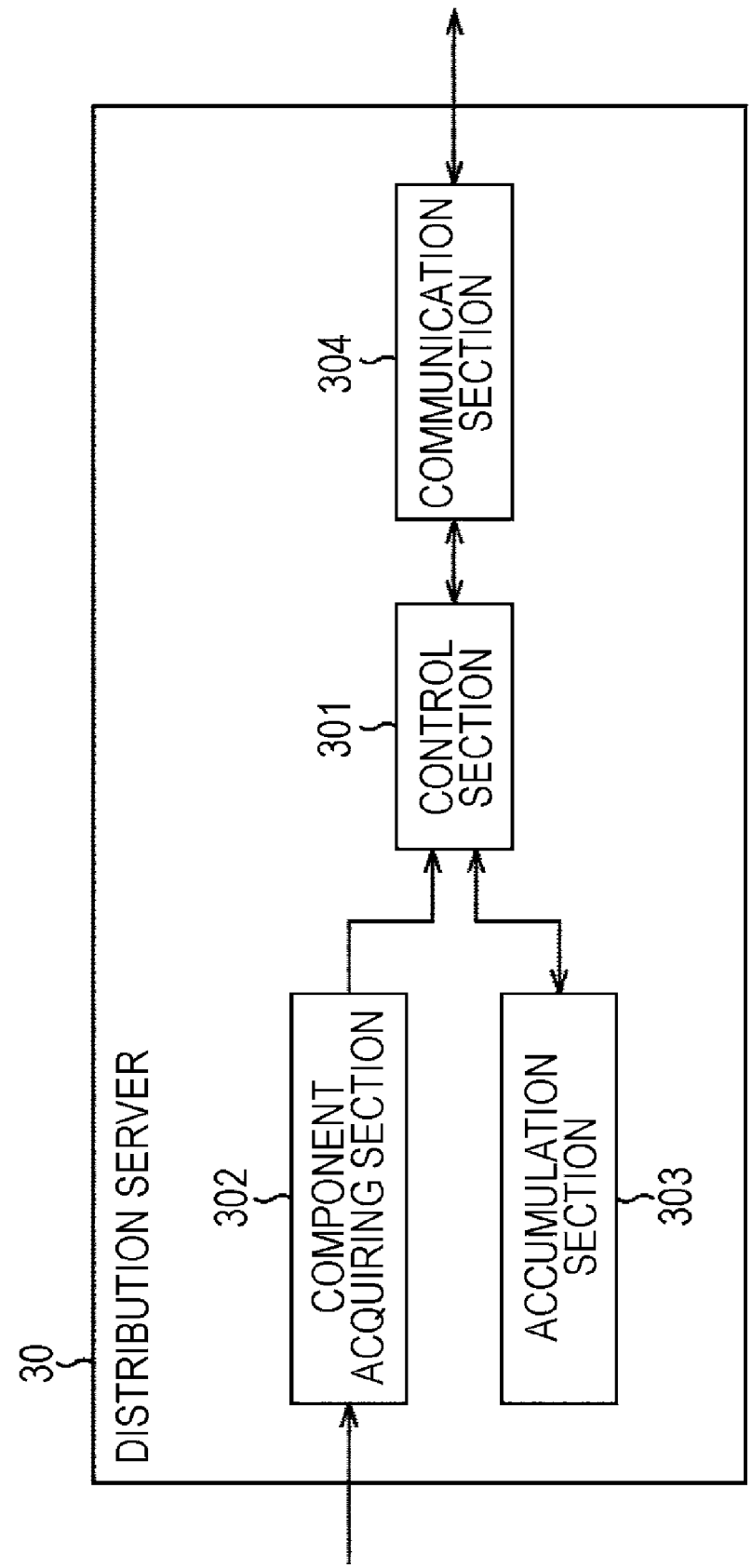

RECEIVING APPARATUS, RECEIVING METHOD, TRANSMITTING APPARATUS, AND TRANSMITTING METHOD

CROSS REFERENCE TO RELATED APPLICATIONS

This application is a continuation of U.S. Ser. No. 15/129,034, filed Sep. 26, 2016 which is a National Stage of PCT/JP2015/001907, filed Apr. 3, 2015 and claims the benefit of Japan Application No. 2014-078032, filed Apr. 4, 2014. The entire contents of each of which are incorporated herein by reference.

TECHNICAL FIELD

The present technique relates to a receiving apparatus, a receiving method, a transmitting apparatus, and a transmitting method and, in particular, relates to a receiving apparatus, a receiving method, a transmitting apparatus, and a transmitting method in which it is possible to select an optimum component from components which are transferred in a broadcast or by communication.

BACKGROUND ART

In recent years, in the field of digital broadcasting, in addition to services which use broadcasting, hybrid type services which are coordinated with communication are being introduced (for example, refer to PTL 1). In such a hybrid type service, it is possible to transfer components such as video, audio, or subtitles for providing the service using either broadcasting or communication.

CITATION LIST

Patent Literature

[PTL 1]
Japanese Unexamined Patent Application Publication No. 2011-66556

SUMMARY OF INVENTION

Technical Problem

While it is possible to supply various types of services due to the introduction of hybrid type services, it is necessary to select an optimum component from components which are transferred in a broadcast or by communication. However, a technical method for selecting an optimum component from components which are transferred in a broadcast or by communication has not been established.

It is desirable to be able to select an optimum component from components which are transferred in a broadcast or by communication.

Solution to Problem

A receiving apparatus of a first embodiment of the present technique is a receiving apparatus including circuitry configured to receive a digital broadcast signal which uses an internet protocol (IP) transfer method. Based on control information included in the digital broadcast signal, the circuitry acquires at least one of a broadcast component or a communication component, and controls an operation of each section which performs a predetermined process relating to the acquired at least one component. The broadcast component and the communication component are associated with a component hierarchy including a first hierarchy level, a second hierarchy level, and a third hierarchy level for each component category. The third hierarchy level is for adaptively selecting the broadcast component or the communication component. The second hierarchy level is for synthesizing the component which is adaptively selected in the third hierarchy level and a component which is not a target in the third hierarchy into one synthesized component. The first hierarchy level is for selecting one of the synthesized component which is synthesized in the second hierarchy level, the component which is adaptively selected in the third hierarchy level, and a component which is not a target in the second hierarchy level and the third hierarchy level.

The receiving apparatus may be an independent apparatus, or may be an inner section block which configures one apparatus.

A receiving method of the first embodiment of the present technique is a receiving method which corresponds to the receiving apparatus of the first embodiment of the present technique.

In the receiving apparatus and the receiving method of the first embodiment of the present technique, a digital broadcast signal which uses an IP transfer method is received. Based on control information included in the digital broadcast signal, at least one of a broadcast component and a communication component is acquired and an operation of each section of the receiving apparatus which performs a predetermined process relating to the acquired at least one component is controlled. The broadcast component and the communication component are associated with a component hierarchy including a first hierarchy level, a second hierarchy level, and a third hierarchy level for each component category. The third hierarchy level is for adaptively selecting the broadcast component or the communication component. The second hierarchy level is for synthesizing the component which is adaptively selected in the third hierarchy level and a component which is not a target in the third hierarchy into one synthesized component. The first hierarchy level is for selecting one of the synthesized component which is synthesized in the second hierarchy level, the component which is adaptively selected in the third hierarchy level, and a component which is not a target in the second hierarchy level and the third hierarchy level.

A transmitting apparatus of a second embodiment of the present technique is a transmitting apparatus including circuitry configured to acquire control information, acquire a broadcast component of a service, and transmit the control information in addition to the broadcast component in a digital broadcast signal which uses an IP transfer method. The broadcast component and a communication component are associated with a component hierarchy structure including a first hierarchy level, a second hierarchy level, and a third hierarchy level for each component category. The third hierarchy level is for adaptively selecting the broadcast component or the communication component. The second hierarchy level is for synthesizing the component which is adaptively selected in the third hierarchy level and a component which is not a target in the third hierarchy level into one component. The first hierarchy level is for selecting one of the component which is synthesized in the second hierarchy level, the component which is adaptively selected in the third hierarchy level, and a component which is not a target in the second hierarchy level and the third hierarchy level.

The transmitting apparatus may be an independent apparatus, or may be an inner section block which configures one apparatus.

A transmitting method of a second embodiment of the present technique is a transmitting method which corresponds to the transmitting apparatus of the second embodiment of the present technique.

In the transmitting apparatus and the transmitting method of the second embodiment of the present technique, control information is acquired, a broadcast component of a service is acquired, and the control information is transmitted in addition to the broadcast component in digital broadcast signal which uses an IP transfer method. The broadcast component and a communication component are associated with a component hierarchy structure including a first hierarchy level, a second hierarchy level, and a third hierarchy level for each component category. The third hierarchy level is for adaptively selecting the broadcast component or the communication component. The second hierarchy level is for synthesizing the component which is adaptively selected in the third hierarchy level and a component which is not a target in the third hierarchy level into one component. The first hierarchy level is for selecting one of the component which is synthesized in the second hierarchy level, the component which is adaptively selected in the third hierarchy level, and a component which is not a target in the second hierarchy level and the third hierarchy level.

Advantageous Effects of Invention

It is desirable to select an optimum component from components which are transferred in a broadcast or by communication according to the first embodiment and the second embodiment of the present technique.

Here, the effects described here are not necessarily limited and may be any of the effects described in the present disclosure.

BRIEF DESCRIPTION OF DRAWINGS

FIG. 3 is a diagram which shows a configuration of a broadcast wave of digital broadcasting with an IP transfer method.

FIG. 4 is a diagram which shows a component layer structure.

FIG. 5 is a diagram of a component layer structure.

FIG. 6 is a diagram which shows a configuration example of signaling information.

FIG. 15 is a diagram which shows syntax of an SPD.

FIG. 16 is a diagram which shows syntax of a component layer descriptor.

FIG. 17 is a diagram which shows syntax of an SPD.

FIG. 18 is a diagram which shows a configuration of one embodiment of a broadcast communication system to which the present technique is applied.

FIG. 19 is a diagram which shows a configuration of one embodiment of a transmitting apparatus to which the present technique is applied.

FIG. 20 is a diagram which shows a configuration of one embodiment of a distribution server to which the present technique is applied.

DESCRIPTION OF EMBODIMENTS

Below, description will be given of embodiments of the present technique with reference to the diagrams. Here, description will be performed in the following order.
1. Summary of Digital Broadcasting using IP Transfer Method
2. Component Layer Structure
   (1) Details of Component Layer Structure
   (2) Specific Examples of Component Layer Structure
3. Configuration of Signaling Information
   (1) Details of Signaling Information
   (2) Component Layer Correspondence using MPD
   (3) Coordination of SPD and MPD
   (4) Syntax
4. System Configuration
5. Flow of Specific Processes Executed in each Apparatus
6. Configuration of Computer
<1. Summary of Digital Broadcasting using IP Transfer Method>
(Protocol Stack)

Figure 1:
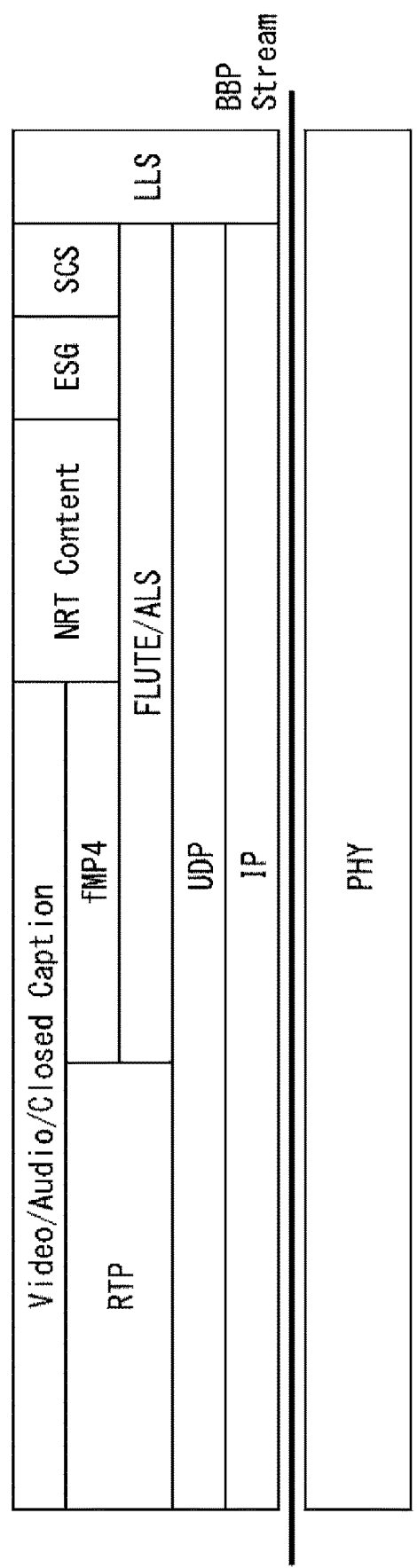
FIG. 1 is a diagram which shows a protocol stack of digital broadcasting with an IP transfer method.

FIG. 1 is a diagram which shows a protocol stack of digital broadcasting with an IP transfer method.

As shown in FIG. 1, the lowest hierarchy is set as a physical layer and a frequency band of a broadcast wave which is assigned for a service (channel) corresponds thereto. A higher hierarchy adjacent to the physical layer is set as an IP layer by interposing a base band packet stream (BBP stream). The BBP stream is a stream which includes a packet in which various types of data in an IP transfer method are stored.

The IP layer is equivalent to an internet protocol (IP) in a TCP/IP protocol stack and an IP packet is specified by an IP address. A higher hierarchy adjacent to the IP layer is set as a UDP layer and even higher hierarchies than the UDP layer are set as an RTP and a FLUTE/ALS. That is, in a digital broadcast with an IP transfer method, a packet where a port number of a user datagram protocol (UDP) is designated is transmitted and for example, a real-time transport protocol (RTP) session or a file delivery over unidirectional transport (FLUTE) session is established.

A higher hierarchy adjacent to the FLUTE/ALS is set as a fragmented MP4 (fMP4) and higher hierarchies adjacent to the RTP and fMP4 are set as video data (Video), audio data (Audio), subtitles data (Closed Caption), and the like. That is, an RTP session is used in a case of transferring video data or audio data in a stream format and a FLUTE session is used in a case of transferring video data or audio data in a file format.

In addition, the higher hierarchy of the FLUTE/ALS is set as NRT content, ESG, and SCS, and the NRT content, ESG, and SCS are transferred by a FLUTE session. The NRT content is content which is transferred in a non-real time (NRT) broadcast and playback is performed after the NRT content is temporarily accumulated in a storage of a receiving device. Here, the NRT content is one example of content and files of other content may be transferred by a FLUTE session. ESG is an electronic service guide.

Service channel signaling (SCS) is signaling information in a service unit and is transferred by a FLUTE session. For example, a service parameter description (SPD), a user service description (USD), a media presentation description (MPD), and a session description protocol (SDP) are transferred as SCS.

Low layer signaling (LLS) is signaling information of a low layer and is transferred on a BBP stream. For example, service configuration information such as a service configuration description (SCD), an emergency alerting description (EAD), and a region rating description (RRD) is transferred as LLS.

(ID System in IP Transfer Method)

Figure 2:
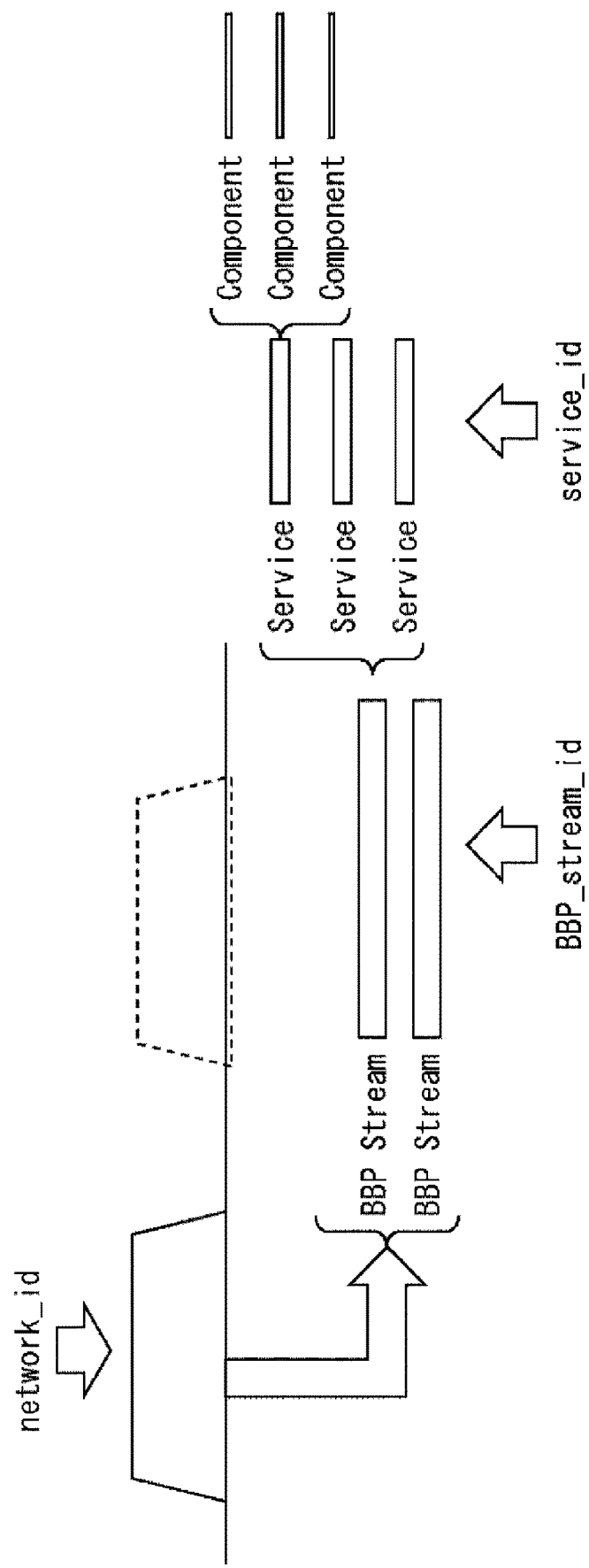
FIG. 2 is a diagram which shows a relationship between a signal of a broadcast wave of digital broadcasting which uses an IP transfer method and an ID system of an IP transfer method.

FIG. 2 is a diagram which shows a relationship between a signal of a broadcast wave of digital broadcasting which uses an IP transfer method and an ID system of an IP transfer method.

As shown in FIG. 2, a network ID (network_id) is assigned to a broadcast wave (broadcast network) which has a predetermined frequency band (6 MHz). One or a plurality of BBP streams which are distinguished by a BBP stream ID (BBP_stream_id) are included in each broadcast wave. A BBP stream is configured by a plurality of BBP packets formed of a BBP header and a payload.

One or a plurality of services which are distinguished by a service ID (service_id) are included in each BBP stream. Each service is configured by one or a plurality of components. Each component is, for example, information which configures a program such as video data, audio data, and subtitles.

In this manner, a configuration which corresponds to a combination (referred to below as a "triplet") of a network ID (network_id), a transport stream ID (transport_stream_id), and a service ID (service_id) which are used in an MPEG2-TS method is adopted as an ID system of an IP transfer method and a BBP stream configuration and a service configuration in a broadcast network are shown according to the triplet. However, in an ID system of an IP transfer method, a BBP stream ID is used instead of a transport stream ID.

Since it is possible to obtain a match with an MPEG2-TS method which is currently widespread by using such an ID system, for example, it is possible to easily obtain correspondence with a simulcast when shifting from an MPEG2-TS method to an IP transfer method.

(Configuration of Broadcast Wave by IP Transfer Method)

FIG. 3 is a diagram which shows a configuration of a broadcast wave of digital broadcasting with an IP transfer method.

As shown in FIG. 3, a plurality of BBP streams are transferred in a broadcast wave ('Network' in the diagram) which has a predetermined frequency band. In addition, a network time protocol (NTP), a plurality of service channels, an electronic service guide (ESG Service), and LLS are included in each BBP stream. However, the NTP, the service channel, and the electronic service guide are transferred according to a UDP/IP protocol, but the LLS is transferred on a BBP stream. In addition, the NTP is timing information and is common to a plurality of service channels.

A component such as video data or audio data and SCS such as SPD or SDP are included in each service channel. In addition, a common IP address is given to each service channel and it is possible to package a component, a control signal (SCS), or the like for one or each of a plurality of service channels using the IP address. Here, in FIG. 3, the network, the BBP stream, and the component correspond to FIG. 2; however, the service channel corresponds to the service in FIG. 2.

<2. Component Layer Structure>

(1) Details of Component Layer Structure

FIG. 4 is a diagram which shows a component layer structure.

As shown in FIG. 4, each component of video, audio, and subtitles (captions) is configured by three hierarchies of a selective layer, a composite layer, and an adaptive layer. In the hierarchy structure, a composite layer is arranged as a higher hierarchy of an adaptive layer and a selective layer is arranged as a higher hierarchy of the composite layer. Below, description will be given of the details of each of the layers in sequence.

(Adaptive Layer)

Firstly, description will be given of the adaptive layer. As shown in FIG. 4, in an adaptive layer which is the lowest hierarchy, one symbol with a circular shape with a different pattern represents a component (broadcast Component) which is transmitted by a broadcast wave and the other symbol represents a component (broadband Component) which is distributed via a network. These components are distributed by so-called adaptive streaming and a plurality of components with different bit rates are prepared. Here, in the example in FIG. 4, one broadcast component is prepared for each category; however, a plurality may be prepared. In addition, here, the classifications of components such as video, audio, or subtitles are referred to as categories.

In the adaptive layer, one component is selected from a plurality of components by a straight line which swings left to right on a dotted arc in the diagram functioning as a switch. That is, an adaptive layer is a hierarchy for dynamically switching a plurality of components to function as one component based on an adaptive determination of a receiving device in each component category. However, in a case in which there is only one component, a selection using the switch is not performed and this component only is selected every time.

In addition, it is possible to designate a transfer path or a bit rate of a component as an attribute of an adaptive selection target in the adaptive layer. For example, broadcast or communication is designated as an attribute value of a transfer path. In addition, for example, 10 Mbps or the like is designated as a bit rate. Furthermore, for example, an attribute relating to the screen resolution or the robustness of the physical layer (PHY) may be designated. Here, the attribute of an adaptive selection target described above is one example and it may be possible to designate another attribute.

Since it is possible to designate such an attribute, an optimum component is adaptively selected and switched every set period (for example, 10 seconds) in a receiving device and adaptive streaming distribution is realized. In detail, in a case in which the transfer path of a component is communication only, it is possible to select a component with an optimum bit rate according to a filled up status of a receiving buffer of a receiving device which changes according to the congestion status of a communication path (for example, a receiving buffer 421 in FIG. 21 which will be described below).

In addition, in a case in which a broadcast is also included in addition to communication as the transfer path of a component, it is possible to determine the selection with the communication component according to the bit rate of a broadcast component. Here, for example, an operation is assumed to be in a case in which each component of 1 Mbps, 2 Mbps, 5 Mbps, 10 Mbps, and 20 Mbps is prepared as a component which is distributed via a network and only a component of 8 Mbps is prepared as a component which is transmitted by a broadcast wave.

In this case, when it is possible for the receiving device to receive a communication component of 10 Mbps or 20 Mbps, since the bit rate is higher for the communication component than the broadcast component, the communication component is received as a priority among the components. In addition, when it is possible to receive a communication component of 5 Mbps without being able to receive communication components of 10 Mbps and 20 Mbps due to congestion, it is possible to operate such that a broadcast component of 8 Mbps which is able to be stably received is selected instead of the communication component. Here, in a case in which a plurality of broadcast components are prepared, for example, changes in a broadcast signal of carrier/noise (C/N) are measured and the broadcast component may be adaptively switched according to the measurement result.

(Composite Layer)

Next, description will be given of the composite layer. As shown in FIG. 4, in a composite layer which is a hierarchy above the adaptive layer, a plurality of components which are adaptively selected by the adaptive layer are synthesized into one component. That is, the composite layer is a hierarchy for combining a plurality of components in a synthesis target component group (referred to below as a "composite component group") to function as one component (a synthesized component) in each component category. However, in a case in which the synthesis target component group is only one component, a synthesizing operation is not necessary.

In addition, it is possible to designate a scalable or a three-dimensional video (3D), a tile, a layer, mixing, or the like as an attribute of the synthesis target in the composite layer. These attributes show types of combinations and it is possible to designate an attribute value which shows an element in such a combination.

"Scalable" is an attribute which shows that a synthesis target component is a component where scalable encoding is carried out. "Base" or "Extended" is designated as an attribute value of the scalable attribute.

For example, in a case of supplying a video with 4K resolution, an encoded signal (a video component) which is equivalent to a video with 2K resolution where "Base" is designated as an attribute value of a scalable attribute is transmitted by a broadcast wave and is distributed via a network by designating "Extended" as an attribute value of a scalable attribute for a video encoded signal (a video component) which is equivalent to the difference between 4K resolution and 2K resolution. Due to this, it is possible for a receiving device which handles 4K resolution to display a video with 4K resolution by synthesizing a base stream which is transferred in a broadcast and an extended stream which is transferred by communication. On the other hand, a receiving device which does not handle 4K resolution only uses the base stream which is transferred in a broadcast and displays a video with 2K resolution.

"3D" is an attribute which shows that the synthesis target component is a component used for 3D. "Right" or "Left" is designated as an attribute value of the 3D attribute. For example, a video signal (a video component) for a right eye where "Right" is designated as an attribute value of the 3D attribute is transmitted in a broadcast wave and a video signal (a video component) for a left eye where "Left" is designated as an attribute value of the 3D attribute is distributed via a network. Due to this, it is possible for a receiving device which handles 3D to display a 3D video by synthesizing the video signal for a right eye and the video signal for a left eye.

"Tile" is an attribute which shows that the synthesis target component is a component for tiling. For example, "Tile A1", "Tile A2" . . . ; "Tile B1", "Tile B2" . . . ; or "Tile C1", "Tile C2" . . . are designated as an attribute value of the tile attribute.

For example, in "Tile A1", "Tile A2" . . . , "Tile A" shows that the type of tiling is type A. In a case of a method in which the type A tiling displays a video for two tiles by lining the tiles up horizontally, a video signal (a video component) for the tile which is arranged on the left side where "Tile A1" is designated as an attribute value of a tile attribute is transmitted by a broadcast wave and a video signal (a video component) for the tile which is arranged on the right side where "Tile A2" is designated as an attribute value of a tile attribute is distributed via a network. Due to this, it is possible for a receiving device which handles the tiling display to display a video which corresponds to a type A tiling by synthesizing a video signal for the left side tile and a video signal for the right side tile.

In the same manner, for example, in a case of a method in which type B tiling displays a video for four tiles by lining up and arranging the tiles to be 2×2, since a video signal (a video component) for the four tiles is transferred in a broadcast or by communication, it is possible to display a 2×2 video which corresponds to the type B tiling by synthesizing the video for the tiles in the receiving device. In addition, for example, in a case of a method in which type C tiling displays a video for a plurality of tiles by arranging the tiles as a panorama video (for example, 360 degrees), since a video signal (a video component) for a plurality of tiles is transferred in a broadcast or by communication, it is possible to display a panorama video which corresponds to the type C tiling by synthesizing a video signal for the tiles in a receiving device. Here, the tiling methods for types A to C described above are examples and it is possible to adopt another tiling method.

"Layer" is an attribute which shows that the synthesis target component is a component layer which is displayed in a hierarchy form. "Layer 1", "layer 2", . . . are designated, for example, in sequence from the back of the overlay as an attribute value of the layer attribute. For example, a video signal (a video component) of a first layer where "layer 1" is designated as an attribute value of the layer attribute is transmitted by a broadcast wave and a video signal (a video component) of a second layer where "layer 2" is designated as an attribute value of the layer attribute is distributed via a network. Due to this, in a receiving device which handles a layer display, it is possible to display a video where the video of the second layer is overlaid on the video of the first layer by synthesizing a video signal of the first layer and a video signal of the second layer.

"Mixing" is an attribute which shows that a synthesis target component is a component to be mixed. For example, "Track 1", "Track 2" . . . are designated as the mixing attribute. For example, a soundtrack (an audio component) where "Track 1" is designated as the attribute value of the mixing attribute is transmitted by a broadcast wave and a soundtrack (an audio component) where "Track 2" is designated as the attribute value of the mixing attribute is distributed via a network. Due to this, it is possible to output sound which is obtained by mixing a soundtrack 1 and a soundtrack 2 (for example, by adjusting a relative volume position or a panning position) in a receiving device which handles mixing.

Here, the attributes of the synthesis target or the attribute values thereof in the composite layer described above are examples and it may be possible to designate another attribute or another attribute value.

(Selective Layer)

Finally, description will be given of the selective layer. As shown in FIG. 4, in the selective layer which is a higher hierarchy of the composite layer and the highest hierarchy, one component is selected from a plurality of components by a straight line which swings left to right on a dotted arc in the diagram functioning as a switch. That is, the selective layer is a hierarchy for statically selecting one or a plurality of components from a component group of a fixed selection target (referred to below as a "selective component group") in each component category according to a predetermined selecting method. As the selecting method, other than selection by a user, automatic selection by a receiving device is possible, for example, according to the performance of a receiving device, the preference information of the user, or the like.

In addition, it is possible to designate a view tag, a language, a receiving device process requesting ability, a view title, a purpose, or the like as an attribute of the fixed selection target in the selective layer.

In detail, "view tag" is a tag for combining different component categories which configure one view. For example, in a case in which "1" is designated as the view tag, components of the video, the audio, and the subtitles to which the ID "1" is given in the diagram are selected by moving to a new category. In the same manner, in a case in which "2" is designated as the view tag, components to which ID "2" is given in the diagram are selected by moving to a new category. Here, components to which a view tag is not given are independent in each category.

For example, a language code is designated for the "language". For example, a desired language is selected by the user by presenting a graphical user interface (GUI) according to the language code. A process requesting ability which is necessary in the receiving device is designated as a "receiving device process requesting ability". The requesting ability may be designated by a level value, or may be multi-dimensionally designated by a codec, a resolution, or the like. For example, when level 2 is designated as the level value in a case of designating a process requesting ability by level value, only a receiving device which has a processing ability of level 2 or more is able to handle the request.

A title for selecting a view screen is designated as a "view title". For example, by displaying the view title as text, a desired view screen is selected by the user. For example, information relating to the purpose of a component, such as sound for narration as opposed to sound for a main part, is designated as the "purpose".

Here, the attributes of the fixed selection target in the selective layer described above are examples and it may be possible to designate another attribute. In addition, the attribute of the fixed selection target is not limited to one and a plurality of attributes may be combined and used.

Since it is possible to designate such fixed selection target attributes, for example, an application which is being executed in the receiving device is able to select a component based on the attribute of the fixed selection target. However, in a case in which there is only one selective component group, selection is not necessary and the selective component group is selected. In addition, components are selected in group units in a case of being grouped in a combination of components of different categories such as video, audio, and subtitles by view tag.

In addition, in a case in which a plurality of components are selected in the receiving device, when the selection target is the video and subtitles components, a plurality of screens for the video and subtitles are displayed. In addition, in a case in which a plurality of components are selected, when the selection target is only the audio component, a plurality of sounds are mixed (mixing) and then output.

Here, a case in which one selective layer is present in each component category is shown in the example of a component layer structure in FIG. 4; however, a plurality of selective layers may be present in each component category. In addition, in the component layer structure in FIG. 4, description is given with the components of the video, the audio, and the subtitles as the components; however, it is possible to adopt the same layer structure for other components which configure a service.

(Diagram of Component Layer Structure)

FIG. 5 is a diagram of a component layer structure.

In FIG. 5, a pick one component which is a level 3 layer is equivalent to the adaptive layer in FIG. 4 and one component is selected from n (n is an integer of 0 or greater) elementary components. Here, the elementary components in FIG. 5 represent the components themselves such as the video, the audio, the subtitles, and the like.

A composite component which is a level 2 layer is equivalent to the composite layer in FIG. 4 and n (n is an integer of 0 or greater) components selected in the level 3 pick one component and n (n is an integer of 0 or greater) elementary components are synthesized.

A pick one component which is a level 1 layer is equivalent to the selective layer in FIG. 4 and one component is selected from n (n is an integer of 0 or greater) components which are synthesized in the level 2 composite component, n (n is an integer of 0 or greater) components which are selected in the level 3 pick one component, and n (n is an integer of 0 or greater) elementary components.

In this manner, it is possible to represent the component layer structure in FIG. 4 with a diagram such as shown in FIG. 5.

(Configuration Example of Signaling Information)

FIG. 6 is a diagram which shows a configuration example of signaling information (a control signal) for realizing the component layer structure shown in FIG. 4 and FIG. 5. Here, in the elements and attributes in FIG. 6, "@" denotes the attributes. In addition, the elements and attributes which are indented are designated with respect to the upper elements thereof.

As shown in FIG. 6, a topAttribute attribute is an attribute for final selection and is defined by m0 types (m0 is an integer of 1 or greater). For example, as the topAttribute attribute, it is possible to define a selection number and a selection determination. The selection number designates the number of components which are able to be selected as a whole. In addition, the selection determination designates selection by the user, automatic selection by the receiving device, or the like.

Information relating to a selective component group which is a component group of a fixed selection target is designated as a selective component group element. A selective component group element is an upper element of a selectiveAttribute attribute and a composite component group element. However, the number of occurrences of a selective component group element is n1 (n1 is an integer of 1 or greater).

The selectiveAttribute attribute indicates an attribute which is regulated in relation to a selective component group element, in which m1 (m1 is an integer of 0 or greater) types of attributes of the fixed selection target are regulated. For example, in the selectiveAttribute attribute, individual attributes such as the view tag, the language, the receiving device process requesting ability, the view title, and the purpose are regulated as the attribute of the fixed selection target in the selective layer described above.

Information relating to a composite component group which is a component group which is a synthesis target is designated as a composite component group element. A composite component group element is an upper element of a compositeAttribute attribute and an adaptive component element. However, the number of occurrences of a composite component group element is n2 (n2 is an integer of 1 or greater).

A compositeAttribute attribute indicates an attribute which is regulated in relation to a composite component group element, in which m2 (m2 is an integer of 0 or greater) types of attributes of a synthesis target are regulated. For example, for a compositeAttribute attribute, an individual attribute such as scalable, 3D, tile, layer, and mixing is regulated as the attribute of the synthesis target in the composite layer described above. In addition, these attributes show types of combinations and it is possible to designate an attribute value which shows an element in the combinations thereof.

Information relating to a component of an adaptive selection target is designated as an adaptive component element. An adaptive component element is an upper element of an adaptiveAttribute attribute and a component ID attribute. However, the number of occurrences of the adaptive component element is n3 (n3 is an integer of 1 or greater).

An adaptiveAttribute attribute shows an attribute which is regulated in relation to an adaptive component element, in which m3 (m3 is an integer of 0 or greater) types of attributions of an adaptive selection target are regulated. For example, for an adaptiveAttribute attribute, the transfer path, the bit rate, or the like of a component is individually regulated as the attribute of the adaptive selection target in the adaptive layer described above. The ID of a component is designated as a component ID attribute.

Here, as described with reference to FIG. 6, a data configuration of signaling information for realizing the component layer structure shown in FIG. 4 and FIG. 5 is one example, and it is also possible to adopt another data configuration. In addition, the signaling information is described, for example, in a markup language such as an extensible markup language (XML).

(2) Specific Examples of Component Layer Structure

Next, description will be given of specific examples of the component layer structure described above with reference to FIG. 7 to FIG. 9.

Figure 7:
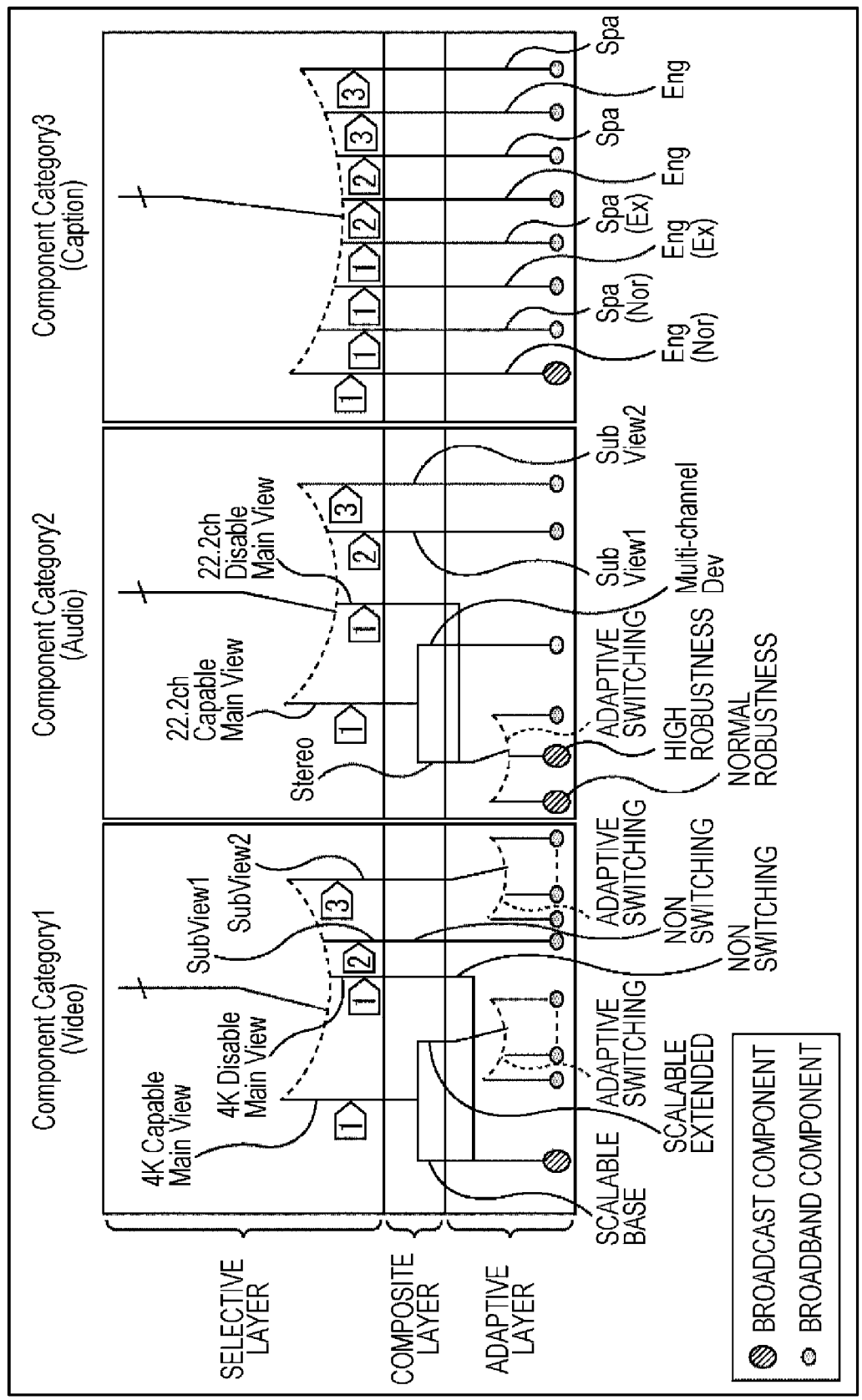
FIG. 7 is a diagram which shows a specific example of a component layer.

In a specific example of a component layer in FIG. 7, scalable is designated as the attribute of a synthesis target in a composite layer of a video, and in an adaptive layer which is a lower hierarchy thereof, a base stream is transferred in a broadcast ("scalable base" in the diagram) and an extended stream is transferred by communication ("scalable extended" in the diagram). Here, since only one broadcast video component of an adaptive selection target is prepared as the base stream, this one broadcast video component is selected every time. On the other hand, since a plurality of communication video components of an adaptive selection target are prepared as the extended stream, an optimum video component is adaptively selected from the plurality of communication video components ("adaptive switching" in the diagram).

In the composite layer of the video, in order to supply a video with 4K resolution, a video encoded signal (a video component) with 2K resolution which is transferred in a broadcast and a video encoded signal (a video component) which is equivalent to the difference between 4K resolution and 2K resolution which is transferred by communication are synthesized. Then, in a selective layer, for example, in a case in which a receiving device process requesting ability is designated as an attribute of the fixed selection target and the receiving device handles 4K resolution, it is possible to display the synthesized video with 4K resolution ("4K capable main view" in the diagram). On the other hand, in a case in which the receiving device does not handle 4K resolution, a video with 2K resolution is displayed using only the base stream which is transferred in a broadcast ("4K disable main view" in the diagram). That is, since the video component of the communication is not used in this case, adaptive selection of the video component is not performed ("non switching" in the diagram).

Figure 8:
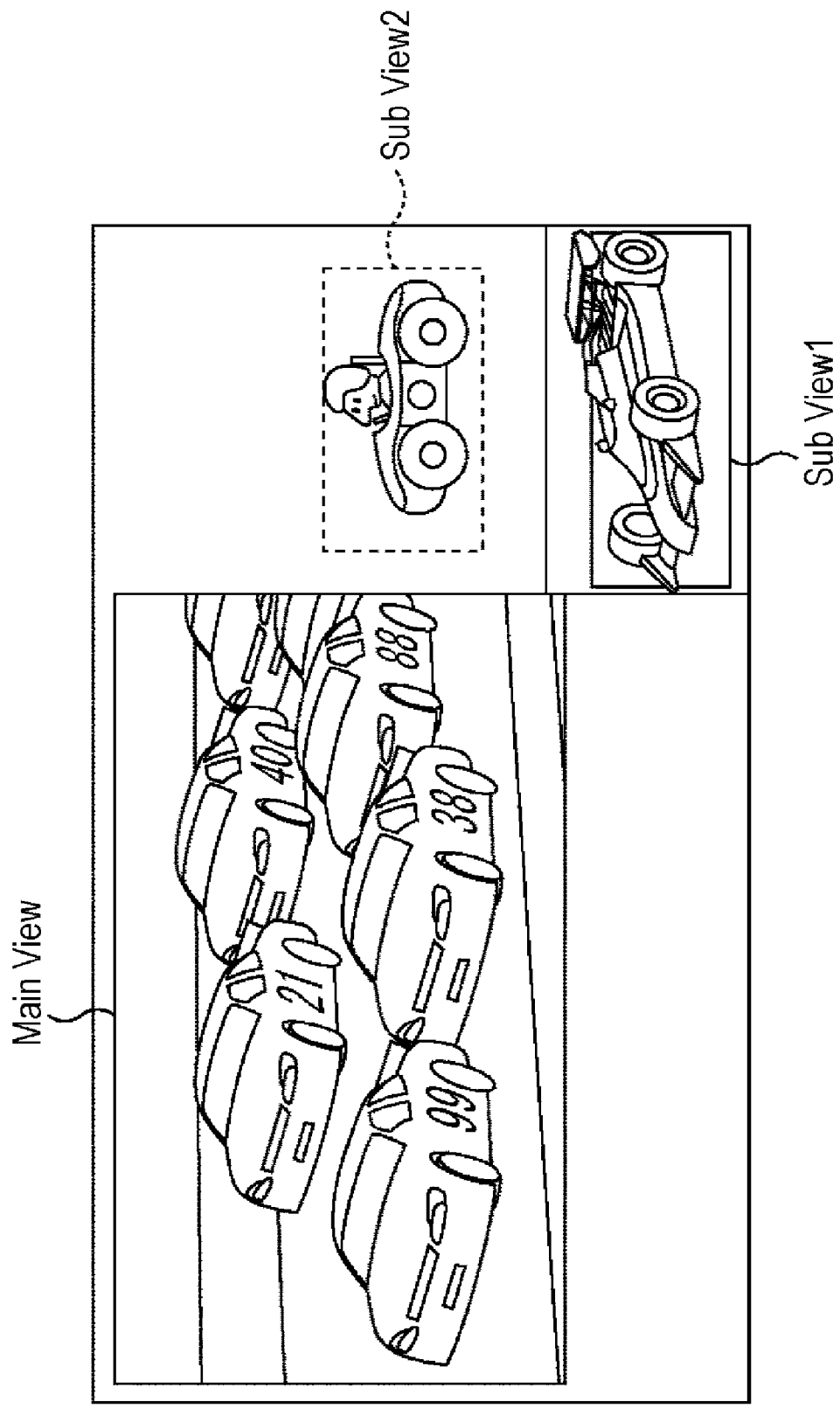
FIG. 8 is a diagram which shows an example of a screen layout.
Figure 9:
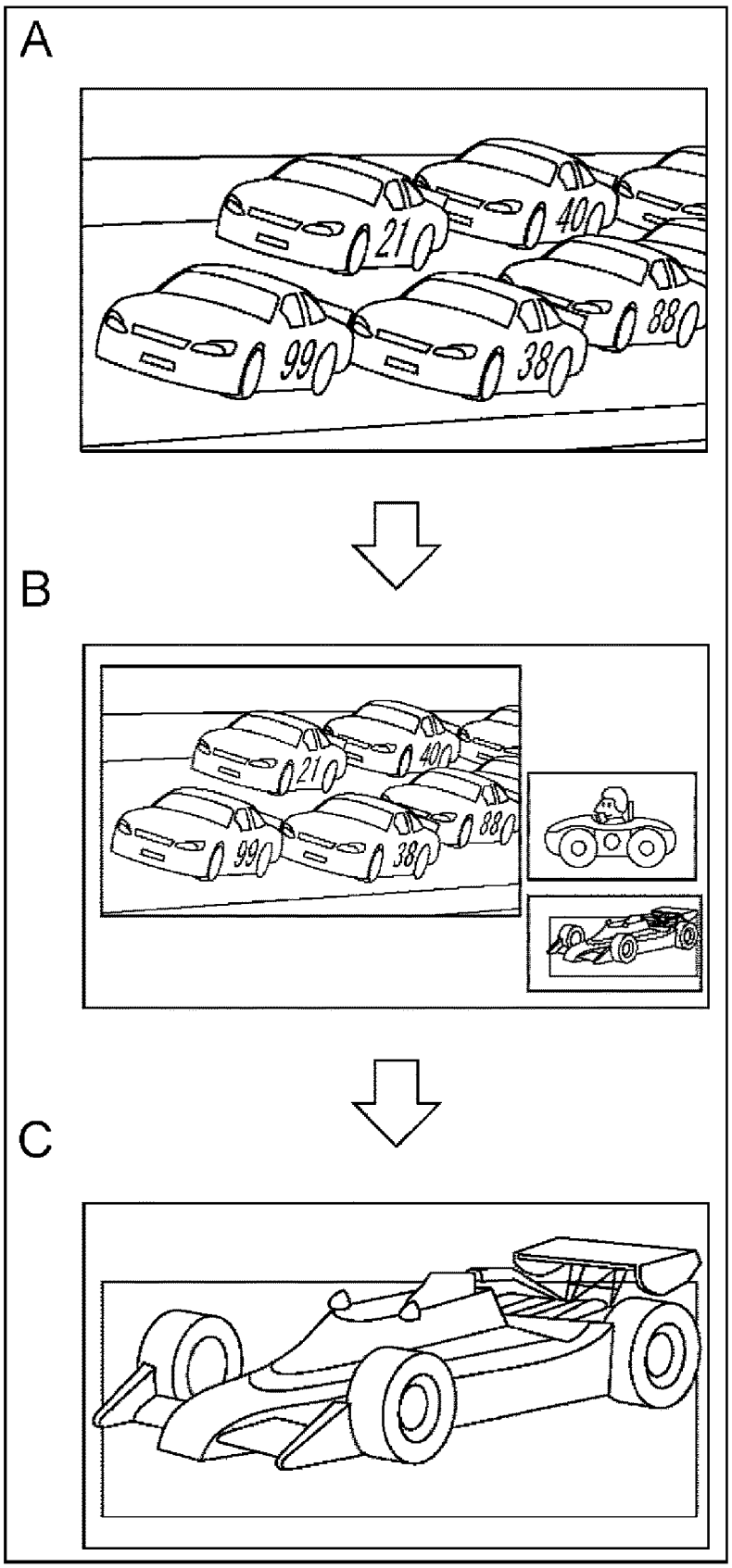
FIG. 9 is a diagram which shows an example of a screen transition.

Here, as shown in FIG. 8, the main view has the meaning of a main display region on a display screen. The video with 4K resolution or 2K resolution described above is displayed in the main view. In addition, it is possible to display a sub view which is an auxiliary display region with respect to the main display region as a screen example in FIG. 8. In the example of a component layer in FIG. 7, it is possible to select a sub view 1 ("sub view 1" in the diagram) and a sub view 2 ("sub view 2" in the diagram) as a selective component group in the selective layer.

In the sub view 1, since only one communication video component is prepared in an adaptive layer, adaptive selection is not performed and this one communication video component is selected every time ("non switching" in the diagram). In addition, in the sub view 2, a plurality of communication video components of an adaptive selection target are prepared in the adaptive layer, and successive optimum communication video components are adaptively selected from a plurality of communication video components ("adaptive switching" in the diagram). Here, in the screen example in FIG. 8, the sub view 1 and the sub view 2 are simultaneously displayed in addition to the main view; however, as shown in the screen examples in FIGS. 9A to 9C, it is possible to allow the user to select which view out of the main view, the sub view 1, and the sub view 2 is to be displayed by the GUI screen or the like.

In the composite layer of the audio, scalable is designated as an attribute of a synthesis target thereof, and in an adaptive layer of a lower hierarchy thereof, a stereo stream is transferred in a broadcast or by communication ("stereo" in the diagram) and a multi-channel stream is transferred by communication ("multi-channel dev" in the diagram).

Here, since a plurality of audio components which are the adaptive selection target are prepared as a stereo stream, an optimum audio component is adaptively selected from the plurality of broadcast or communication audio components ("adaptive switching" in the diagram). That is, by preparing each of an audio component with a normal robustness ("normal robustness" in the diagram) and an audio component with a high robustness ("high robustness" in the diagram) as broadcast audio components and making these able to be adaptively selected, for example, an operation such as outputting only sound is possible in a case in which the audio component with a high robustness is selected even when a video may not be displayed on the receiving device for some reason. In addition, in a case in which a broadcast audio component may not be received, a communication audio component may be selected.

On the other hand, since only one audio component which is an adaptive selection target is prepared as a multi-channel stream, this one communication audio component is selected every time.

In an audio composite layer, a stereo audio component which is transferred in a broadcast and a multi-channel audio component which is transferred by communication are synthesized and a 22.2ch multi-channel synthesized component is generated. Then, in the selective layer, for example, in a case in which a receiving device process requesting ability is designated as an attribute of the fixed selection target and the receiving device handles a 22.2ch multi-channel, it is possible to output sound of the synthesized 22.2ch multi-channel ("22.2ch capable main view" in the diagram). On the other hand, in a case in which the receiving device does not handle a multi-channel of 22.2ch, only a stereo stream which is transferred in a broadcast or by communication is used and stereo sound is output ("22.2ch disable main view" in the diagram).

Here, since view tag 1 is given as the attribute of the fixed selection target of the audio selective layer thereof, the fixed selection target is synchronized with a video component of the selective layer of the video where the view tag 1 is given in the same manner. In other words, the sound which corresponds to the audio component thereof is output with respect to a video which is displayed in the main view of the screen example in FIG. 8.

In addition, as the attribute of the fixed selection target of the selective layer, an audio component to which view tag 2 is given is synchronized with the video component of the selective layer of the video to which view tag 2 is given in the same manner ("sub view 1" in the diagram). In other words, the sound which corresponds to the audio component is output with respect to the video which is displayed in the sub view 1 of the screen example in FIG. 8.

Furthermore, an audio component to which view tag 3 is given is synchronized with the video component to which view tag 3 is given in the same manner ("sub view 2" in the diagram). Here, in the sub view 1 and the sub view 2 of the audio, since only one communication audio component is prepared in the adaptive layer, adaptive selection is not performed and this one communication audio component is selected every time.

In addition, as shown in FIG. 7, since the synthesis of the subtitles component is not performed in the subtitles composite layer and, furthermore, adaptive selection of the subtitles component is not performed in the adaptive layer, the subtitles component in the selective layer and the subtitles component in the adaptive layer correspond one to one. Here, out of the subtitles components, only one subtitles component on the leftmost side in the diagram is transferred in a broadcast and the other subtitles components are transferred by communication.

A subtitles component to which view tag 1 is given as the attribute of the fixed selection target of the selective layer is synchronized with components of the video and the audio to which view tag 1 is given in the same manner. In detail, in the case of the example, English and Spanish subtitles are supplied and more detailed and expository subtitles ("Eng (Ex)" and "Spa(Ex)" in the diagram) are prepared in the subtitles in addition to the subtitles in the main part ("Eng (Nor)" and "Spa(Nor)" in the diagram). In the selective layer of the subtitles, for example, in a case in which language is designated as an attribute of the fixed selection target by a user selection, it is possible to display subtitles according to the language code or the like. That is, subtitles such as English or Spanish which are selected by the user are superimposed and displayed on a video which is displayed on a main view of the screen example in FIG. 8.

In addition, a subtitles component to which the view tag 2 is given as an attribute of a fixed selection target of a selective layer is synchronized with components of the video and the audio to which the view tag 2 is given in the same manner. In detail, since English subtitles ("Eng" in the diagram) and Spanish subtitles ("Spa" in the diagram) are prepared, it is possible to superimpose and display subtitles according to a user selection on the video which is displayed in the sub view 1 of the screen example in FIG. 8.

Furthermore, a subtitles component to which the view tag 3 is given as an attribute of a fixed selection target of a selective layer is synchronized with components of the video and the audio to which the view tag 3 is given in the same manner. In detail, since the English subtitles ("Eng" in the diagram) and the Spanish subtitles ("Spa" in the diagram) are prepared, it is possible to superimpose and display subtitles on the video according to a user selection.

<3. Configuration of Signaling Information>

(1) Details of Signaling Information

Figure 10:
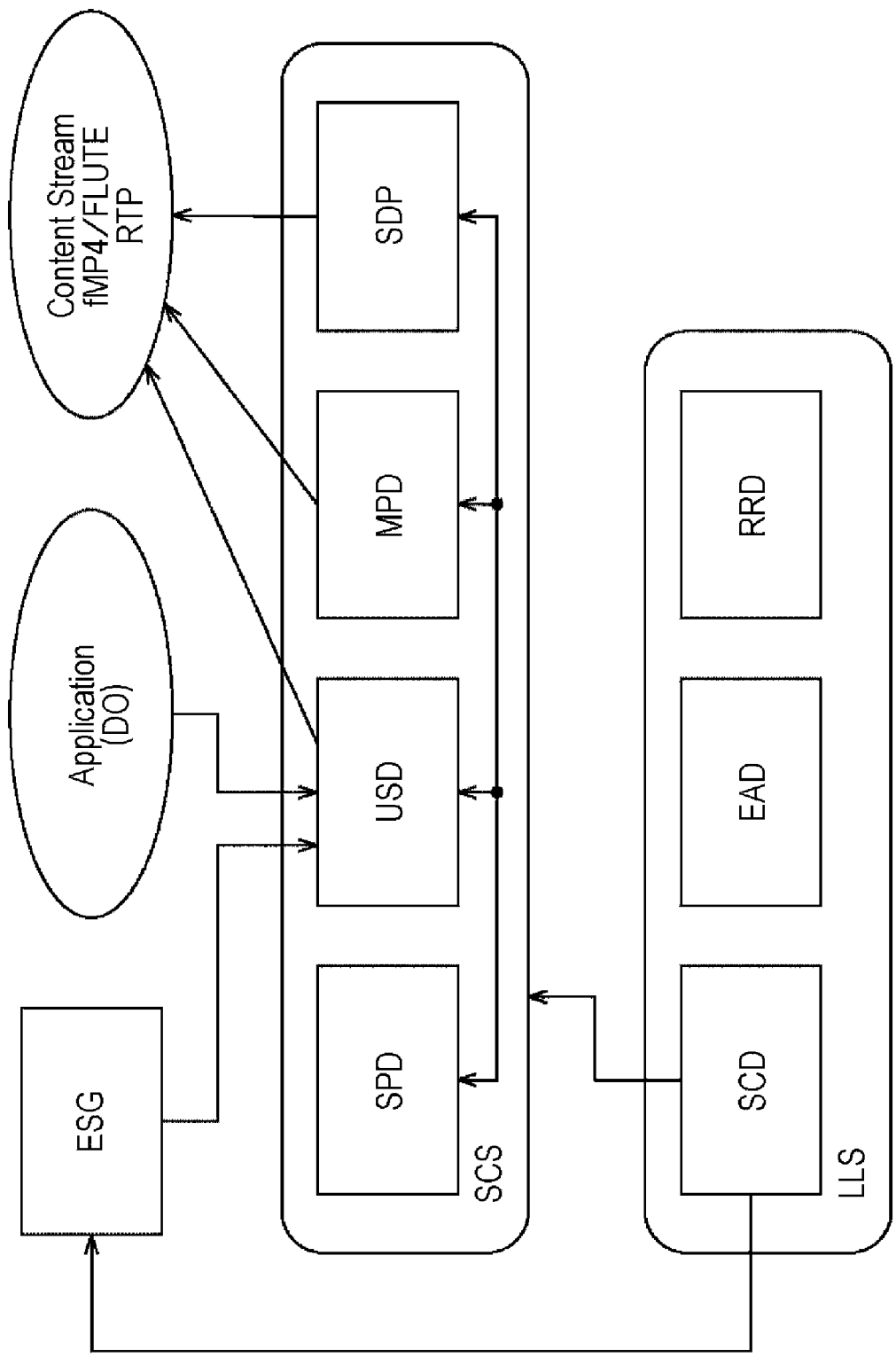
FIG. 10 is a diagram which shows a configuration of signaling information.

FIG. 10 is a diagram which shows details of signaling information.

As described above, for example, a service configuration description (SCD), an emergency alerting description (EAD), and a region rating description (RRD) are transferred as an LLS.

The SCD adopts an ID system which is equivalent to the triplet which is used in an MPEG2-TS method and the BBP stream configuration and the service configuration in a broadcast network are shown due to the triplet. In addition, the SCD includes information such as an IP address as attribute and setting information in a service unit, ESG bootstrap information for accessing an ESG, and SC bootstrap information for accessing an SCS. The EAD includes information relating to an emergency notification. The RRD includes rating information. Here, the SCD, the EAD, and the RRD are described, for example, by a markup language such as an extensible markup language (XML).

For example, a service parameter description (SPD), a user service description (USD), a media presentation description (MPD), and a session description protocol (SDP) are transferred as an SCS.

The SPD includes various types of parameters which are regulated by the level of the service and component. The USD includes information or the like for referring to the MPD or the SDP. The MPD is information for managing adaptive streaming distribution of a component and includes information of a segment uniform resource locator (URL) for each component which is transferred in a service unit.

The SDP includes a service attribute in a service unit, configuration information of a component, a component attribute, filter information of a component, location information of a component, and the like. By using the USD, the MPD, and the SDP, it is possible to acquire a component which is transferred, for example, in an RTP session or a FLUTE session. Here, an SPD, a USD, an MPD, and an SDP are described, for example, by a markup language such as XML.

The ESG is an electronic service guide which includes, for example, information such as a program title or a starting time. It is possible to acquire the ESG by using ESG bootstrap information of the SCD. An application is configured by a file in hypertext markup language (HTML) format or the like and is distributed, for example, from a server on the internet. The application is executed in synchronization with broadcast content such as a television program which is supplied as a specific service. It is possible to correlate the ESG and the application with the USD.

(2) Component Layer Correspondence Using MPD

Figure 11:
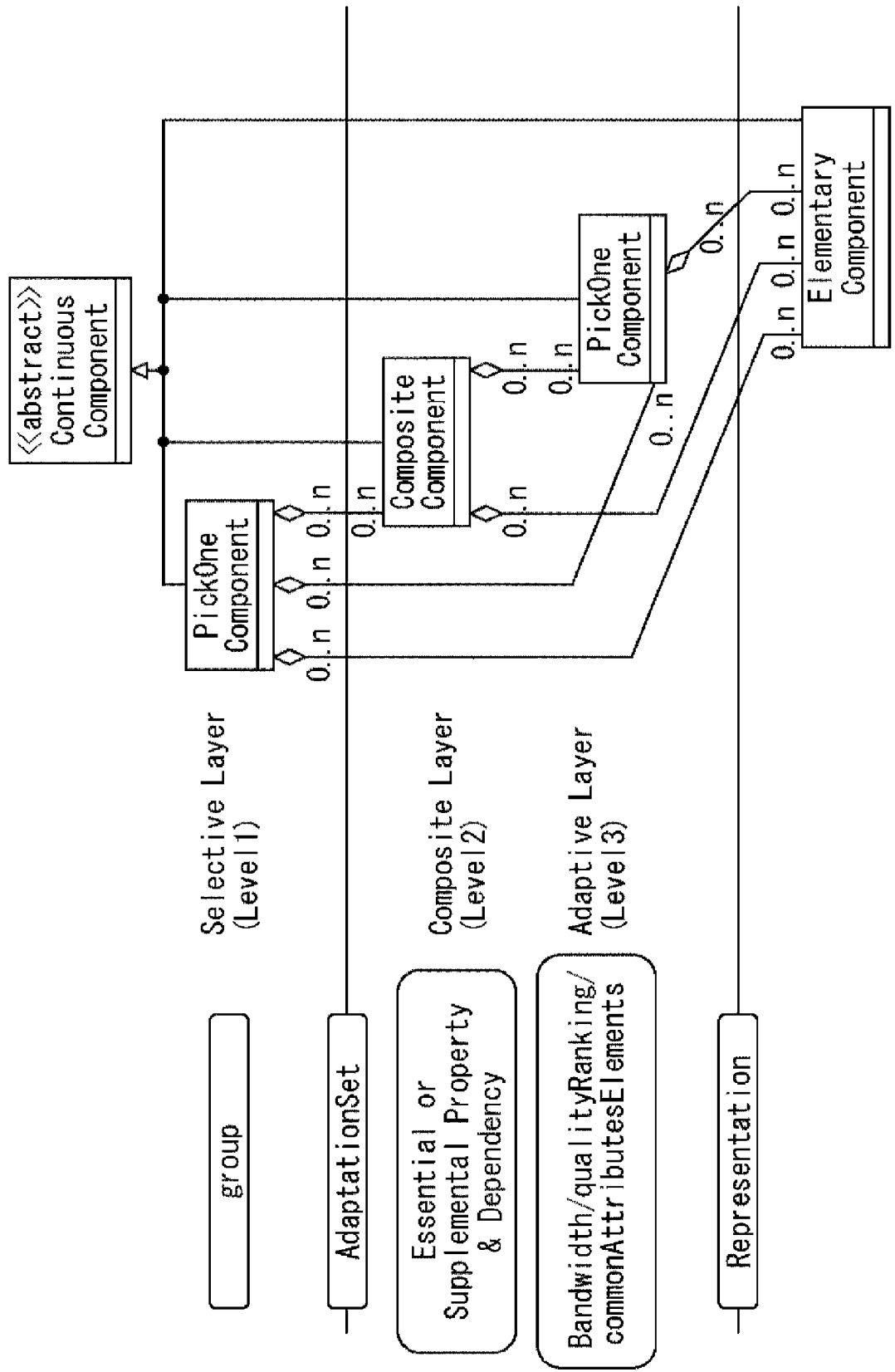
FIG. 11 is a diagram which shows component layer correspondence using MPD.

FIG. 11 is a diagram which shows component layer correspondence using an MPD.

For the MPD, a period element, an adaptation set element, a representation element, and a sub representation element are described in a hierarchy structure. The period element is a unit which describes the configuration of content such as a television program. In addition, the adaptation set element, the representation element, or the sub representation element are used for each stream such as the video, the audio, or the subtitles, and are able to describe the attributes of each stream.

In detail, the adaptation set element represents streams which are encoded from various types of sources. Then, in order to select the stream on the receiving device side according to, for example, a parametric such as a bit rate, a representation element is arranged in an adaptation set element and, for example, streams which are a plurality of choices where parameters such as the bit rate are different are listed. Typically, an adaptation set element or a representation element correspond with a single stream such as a stream of video, audio, or subtitles.

Here, it is possible to realize the function of the level 3 layer in FIG. 11 by mapping a pick one component in an MPD adaptation set element and further mapping a representation element or a sub representation element which are listed in an adaptation set element in an elementary component.

In addition, it is possible to realize the function of the level 2 layer in FIG. 11 by mapping in a dependence relationship description attribute which defines a relationship between MPD adaptation set elements, a relationship between representation elements, or a relationship between sub representation elements. As the dependence relationship description attribute, it is possible to group an adaptation set attribute group by defining a new element by using an essential property element or a supplemental property element which is a lower element of an adaptation set element which is regulated by the MPD.

Furthermore, it is possible to realize the function of the level 1 layer in FIG. 11 by mapping in a group attribute of an MPD adaptation set element. The group attribute of the adaptation set element is for grouping adaptation set elements and adaptation set elements which have the same attribute value belong to the same group. Then, one adaptation set element is selected from a plurality of adaptation set elements in the same group.

Specific Operative Examples 1

Figure 12:
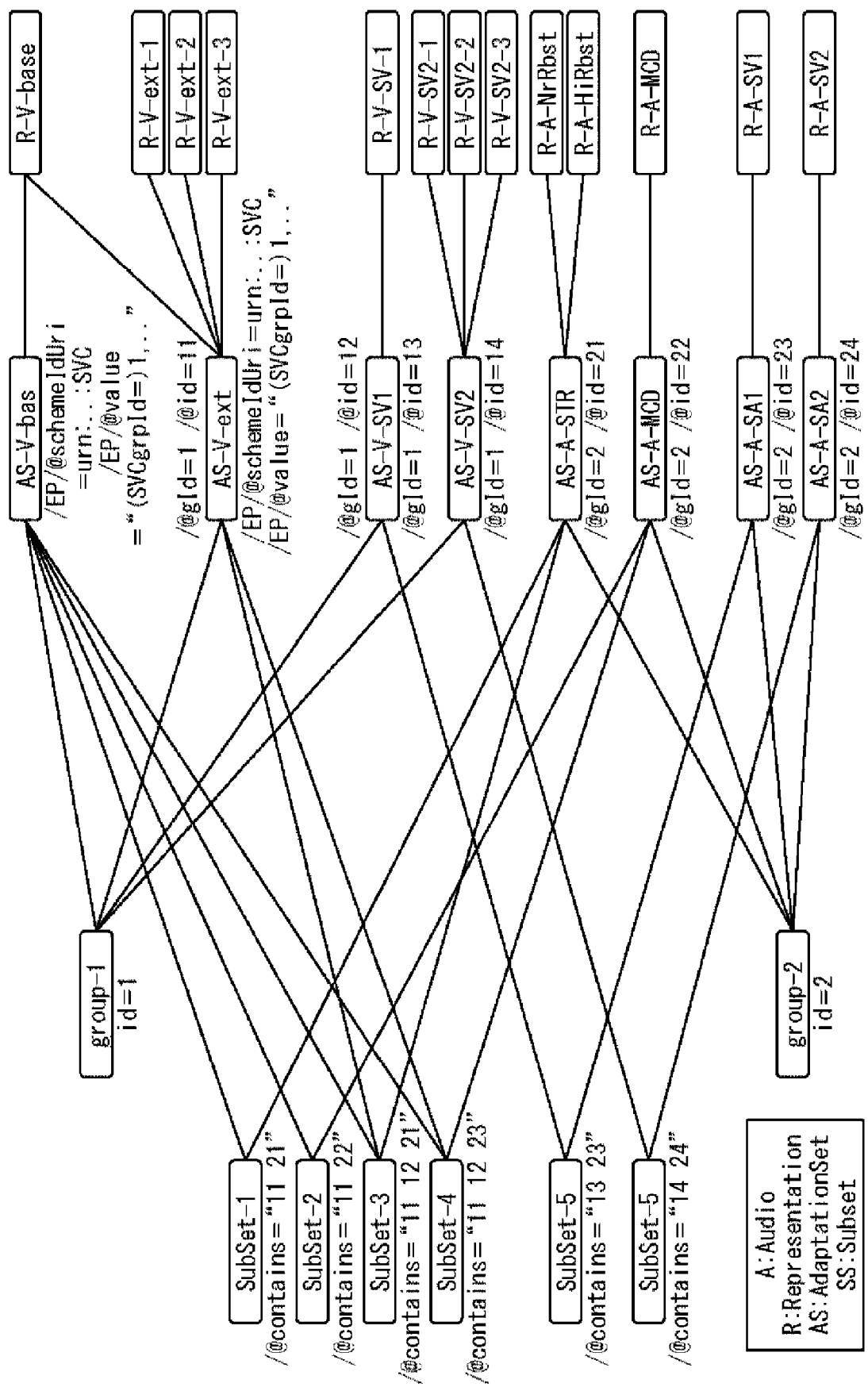
FIG. 12 is a diagram which shows a specific operative example of component layer correspondence using MPD.

FIG. 12 is a diagram which shows a specific operative example of component layer correspondence using an MPD.

Description content of the MPD for realizing the operative example is shown in FIG. 12 and "AS" indicates an adaptation set element and "R" indicates a representation element. In addition, an ID attribute shown by "@id" and a group attribute shown by "@gid" are described in the adaptation set element. Furthermore, "@schemeIdUri" represents a schemeIdUri attribute of an essential property element.

Four adaptation set elements (id="11", "12", "13", and "14") which belong to a group 1 of a video and four adaptation set elements (id="21", "22", "23", and "24") which belong to a group 2 of an audio are described in the MPD in FIG. 12 and one or a plurality of representation elements are described in a subordinate of each of the adaptation set elements.

In the group 1 of the video, "base", "ext", "SV1", and "SV2" are listed as video components in each representation element. Here, "base" represents a video component which is equivalent to a basic video signal which is able to be played back independently and "ext" represents a video component which is equivalent to a video signal for extension. In addition, in "SV1" and "SV2", "SV" represents a sub view which is an auxiliary region with respect to the main view which is the main display region.

Only one representation element is described in a subordinate of the adaptation set element with id="11" and one video component which is equivalent to a basic video signal which is able to be played back independently is selected every time. The video component which is selected in this manner is equivalent to an elementary component. Here, the video component is for the main view.

"urn:...:SVC" is designated as an attribute value of a schemeIdUri attribute of an essential property element in an adaptation set element with id="12". Here, in the operative example in FIG. 12, "urn:...:SVC" is defined as an attribute value of a schemeIdUri attribute of an essential property element, and an adaptation set attribute which has an essential property element which has the attribute value is defined so as to have a meaning that representation element groups in a subordinate thereof have a dependence relationship of a base-enhance relationship with each other.

Accordingly, four representation elements in a subordinate of an adaptation set element with id="12" have a dependence relationship of a base-enhance relationship. In other words, four representation elements are described in a subordinate of an adaptation set element with id="12", one video component which is equivalent to a basic video signal is listed, three video components which are equivalent to a video signal for extension are listed, and there is a dependence relationship of a base-enhance relationship. Due to this, in the level 3 (a pick one component) layer, for example, a video component which is equivalent to a basic video signal and a video signal for extension is selected according to network environment conditions or the like. Here, the video component is for the main view.

In this manner, in the MPD, an essential property element is used in order to express features of a component group which is listed in a representation element in a subordinate of an adaptation set attribute.

Only one representation element is described in a subordinate of an adaptation set element with id="13" and one video component for the sub view 1 is selected every time. The video component which is selected in this manner is equivalent to an elementary component.

Three representation elements are described in a subordinate of an adaptation set element with id="14" and three video components for the sub view 2 are listed and in the level 3 (a pick one component) layer, for example, one video component is adaptively selected according to network environment conditions or the like.

In this manner, by mapping a pick one component in an adaptation set element and further mapping a representation element which is listed in an adaptation set element in an elementary component, the function of the level 3 layer in the component layer structure in FIG. 11 is realized and selection of the video component is performed.

Here, in the MPD in FIG. 12, group="1" is designated as a group attribute in an adaptation set element with id="11", an adaptation set element with id="12", an adaptation set element with id="13", and an adaptation set element with id="14" and the adaptation set elements belong to the same group 1.

In this manner, by performing grouping according to the group attribute, the function of the level 1 layer in the component layer structure in FIG. 11 is realized and one video component is selected from video components in the same group in the level 1 (a pick one component) layer. Here, one video component is selected from the video components and elementary components which are selected in the level 3 (a pick one component) layer which belongs to the group 1.

On the other hand, in the group 2 of the audio, "NrRbst", "HiRbst", "MCD", "SV1", and "SV2" are listed as audio components in each representation element. "NrRbst" has a meaning of an audio component with a normal robustness. In addition, "HiRbst" has a meaning of an audio component with a high robustness. "MCD" indicates a multi-channel audio component. Furthermore, in "SV1" and "SV2", "SV" indicates an audio component for a sub view.

Two representation elements are described and an audio component which has a normal robustness and an audio component which has a high robustness are listed in a subordinate of an adaptation set element with id="21" and in the level 3 (a pick one component) layer, for example, one audio component is adaptively selected according to network environment conditions or the like. Here, the audio component is for the main view.

Only one representation element is described in a subordinate of an adaptation set element with id="22" and one multi-channel audio component is selected every time. An audio component which is selected in this manner is equivalent to an elementary component. Here, the audio component is for the main view.

Only one representation element is described in a subordinate of an adaptation set element with id="23" and one audio component for the sub view 1 is selected every time. In the same manner, one audio component for the sub view 2 is selected every time in a subordinate of an adaptation set element with id="24". An audio component for the sub view which is selected in this manner is equivalent to an elementary component.

Here, in the MPD in FIG. 12, group="2" is designated as a group attribute in an adaptation set element with id="21", an adaptation set element with id="22", an adaptation set element with id="23", and an adaptation set element with id="24" and the adaptation set elements belong to the same group 2.

In this manner, by performing grouping according to the group attribute, the function of the level 1 layer in the component layer structure in FIG. 11 is realized, and one audio component is selected from audio components in the same group in the level 1 (a pick one component) layer. Here, one audio component is selected from audio components and elementary components which are selected in the level 3 (a pick one component) layer which belongs to the group 2.

In addition, in the MPD in FIG. 12, a subset element is used in order to define grouping for simultaneous presentation of a plurality of components such as a video or an audio outside the limits of regulations relating to a component layer structure.

In detail, "11 21" is designated as a contains attribute of a first subset element, which shows that an adaptation set element with id="11" and an adaptation set element with id="21" are a combination of adaptation set elements which are simultaneously presented. That is, a video component ("V-base") and an audio component ("A-NrRbst" or "A-HiRbst") are components for the main view which are simultaneously played back.

"11 22" is designated as a contains attribute of a second subset element, which shows that an adaptation set element with id="11" and an adaptation set element with id="22" are a combination of adaptation set elements which are simultaneously presented. That is, a video component ("V-base") and an audio component ("A-MCD") are components for the main view which are simultaneously played back.

"11 12 21" is designated as a contains attribute of a third subset element, which shows that an adaptation set element with id="11", an adaptation set element with id="12", and an adaptation set element with id="21" are a combination of adaptation set elements which are simultaneously presented. That is, a video component ("V-base" or "V-base" and "V-ext") and an audio component ("A-NrRbst" or "A-HiRbst") are components for the main view which are simultaneously played back.

"11 12 22" is designated as a contains attribute of a fourth subset element, which shows that an adaptation set element with id="11", an adaptation set element with id="12", and an adaptation set element with id="22" are a combination of adaptation set elements which are simultaneously presented. That is, a video component ("V-base" or "V-base" and "V-ext") and an audio component ("A-MCD") are components for the main view which are simultaneously played back.

"13 23" is designated as a contains attribute of a fifth subset element, which shows that an adaptation set element with id="13" and an adaptation set element with id="23" are a combination of adaptation set elements which are simultaneously presented. That is, a video component ("V-SV1") and an audio component ("A-SV1") are components for the sub view 1 which are simultaneously played back.

"14 24" is designated as a contains attribute of a sixth subset element, which shows that an adaptation set element with id="14" and an adaptation set element with id="24" are a combination of adaptation set elements which are simultaneously presented. That is, a video component ("V-SV2") and an audio component ("A-SV2") are components for the sub view 2 which are simultaneously played back.

In this manner, by using a subset element in order to define grouping for simultaneous presentation of a plurality of components such as video or audio outside the limits of regulations relating to a component layer structure in FIG. 11, for example, it is possible to correlate for the main view, for the sub view 1, for the sub view 2, or the like between a video and an audio. In addition, for example, when one component out of components of a video and an audio is specified, the other component is also specified.

Above, description was given of specific operative examples.

(3) Coordination of SPD and MPD

Figure 13:
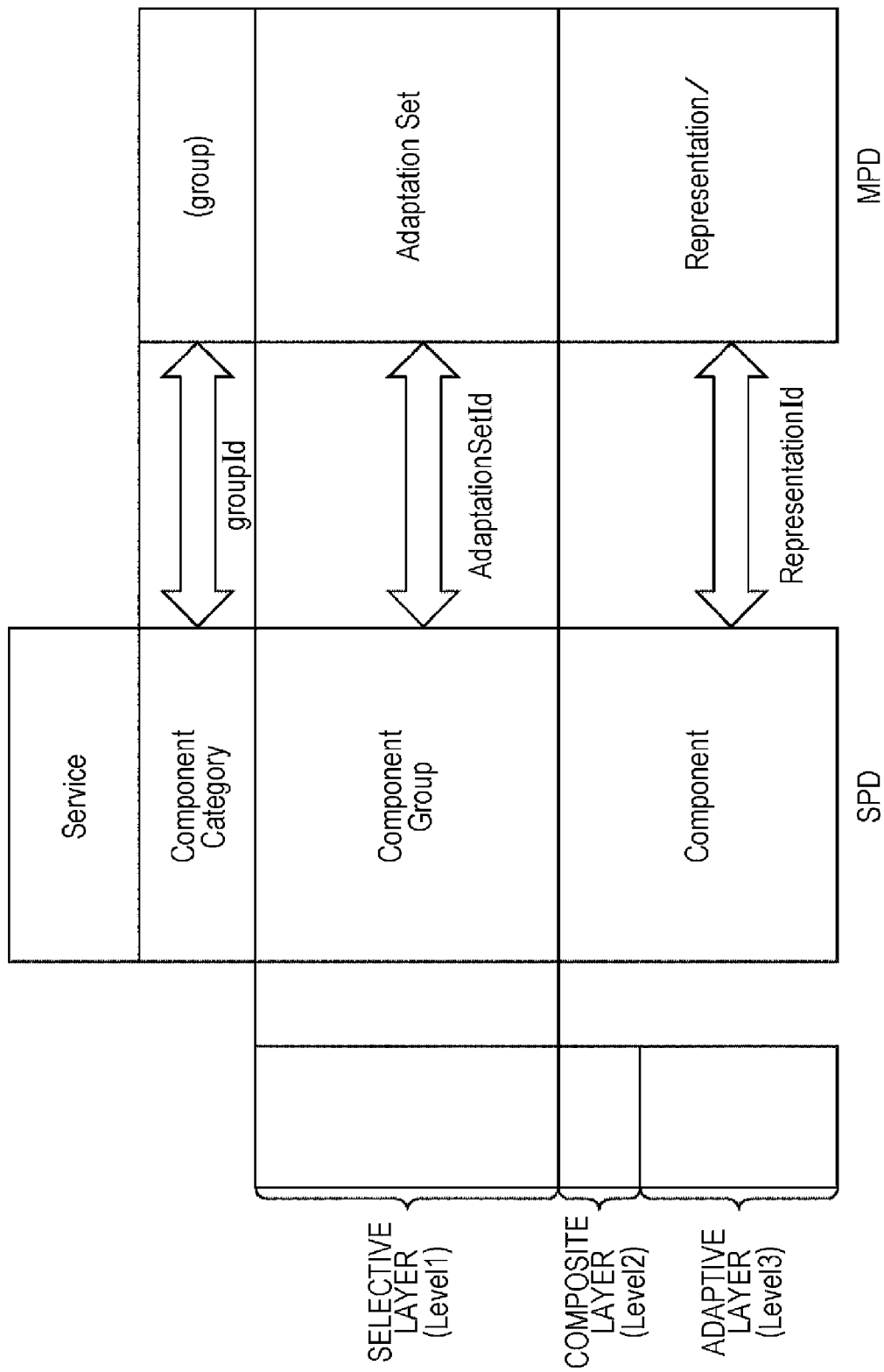
FIG. 13 is a diagram which shows a method for coordinating SPD and MPD.

FIG. 13 is a diagram which shows a method for coordinating SPD and MPD.

As shown in FIG. 13, a component, a component group, a component category, and a service form a hierarchy structure in an SPD. In addition, a representation element, an adaptation set element, and a group form a hierarchy structure in an MPD. However, as described above, an MPD group is equivalent to a group attribute of an adaptation set element.

In such a hierarchy structure, a component of an SPD and a representation element of an MPD are mapped by a representation ID. Furthermore, a component group of an SPD and an adaptation set element of an MPD are mapped by an adaptation set ID. In addition, a component category of an SPD and a group attribute of an adaptation set element of an MPD are mapped by a group ID.

In this manner, since it is possible to perform an operation where an SPD and an MPD are mutually coordinated by mapping in each hierarchy, it is possible to process components (objects) which are included in each layer in a cross-sectional manner by sharing parameters of each layer of the SPD and the MPD. Here, the example of the hierarchy structure in FIG. 13 shows that a hierarchy which corresponds to a component of an SPD is an adaptive layer and a composite layer, and that a hierarchy which corresponds to a component group of an SPD is a selective layer; however, these relationships are examples and, for example, it may be understood that a hierarchy which corresponds to a component of an SPD is an adaptive layer, a hierarchy which corresponds to a component group of an SPD is a composite layer, and a hierarchy which corresponds to a component category of an SPD is a selective layer.

Specific Operative Examples 2

Figure 14:
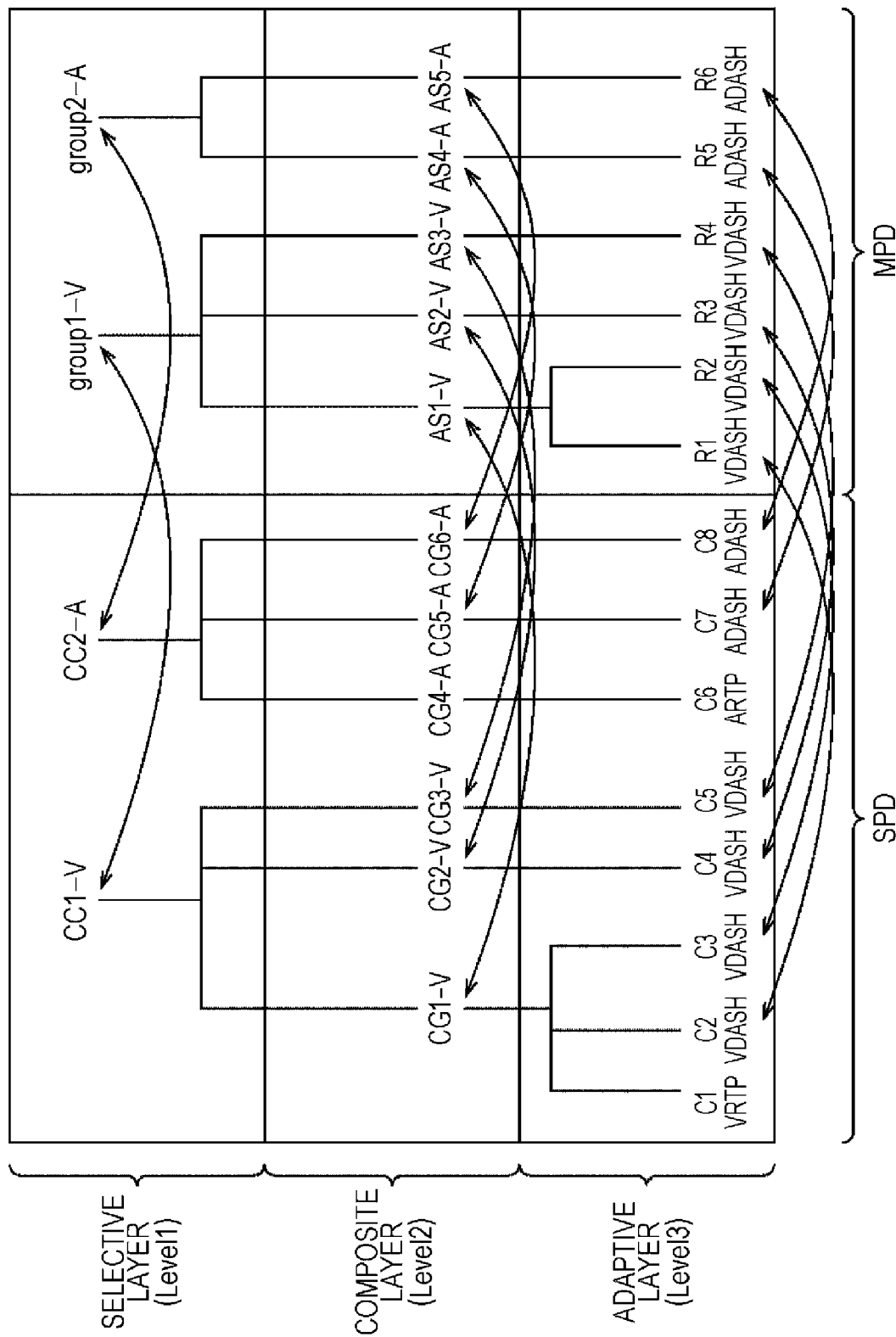
FIG. 14 is a diagram which shows a specific operative example of coordination of SPD and MPD.

FIG. 14 is a diagram which shows a specific operative example of a coordination of SPD and MPD.

In FIG. 14, description content of an SPD is shown on the left side and a description content of an MPD is shown on the right side. In addition, in the same manner as FIG. 4 and the like described above, components of video and audio are configured by three hierarchies of a selective layer, a composite layer, and an adaptive layer.

In the adaptive layer of the SPD, "C" has a meaning of a component, "V" has a meaning of video, and "A" has a meaning of audio. In addition, "RTP" shows that a component is transferred in an RTP session, that is, an RTP stream is transferred in a broadcast. In addition, "DASH" shows that a component is distributed in streaming which conforms to standards of a moving picture expert group—dynamic adaptive streaming over HTTP (MPEG-DASH), that is, a DASH stream is transferred by communication.

In detail, a video component C1 represented by "C1" in the diagram is transferred as an RTP stream in a broadcast. On the other hand, video components C2 to C5 represented by "C2" to "C5" in the diagram are transferred as a DASH stream by communication. Here, the bit rate of the video component C2 is, for example, a low bit rate such as 1 Mbps. On the other hand, the bit rate of the video component C3 is, for example, a high bit rate such as 10 Mbps.

In addition, an audio component C6 represented by "C6" in the diagram is transferred as an RTP stream in a broadcast. An audio component C7 and an audio component C8 represented by "C7" and "C8" in the diagram are transferred as a DASH stream by communication.

On the other hand, in an adaptive layer of an MPD, "R" in the adaptive layer has a meaning of a representation element of an MPD. That is, video components R1 to R4 which are represented by "R1" to "R4" in the diagram and which are described in a representation element are transferred as a DASH stream by communication. Here, the bit rate of the video component R1 is, for example, a low bit rate such as 1 Mbps. On the other hand, the bit rate of the video component R2 is, for example, a high bit rate such as 10 Mbps.

In addition, an audio component R5 and an audio component R6 represented by "R5" and "R6" in the diagram are transferred as a DASH stream by communication.

When adaptive layers of the SPD and the MPD formed by the configuration described above are compared, since the MPD is regulated in order to manage a streaming distribution which conforms to standards of MPEG-DASH, description is basically only given of a components which are transferred by communication as a DASH stream. On the other hand, since description relating to the components is not limited according to the transfer form in the SPD, it is possible to describe both components which are transferred in a broadcast as an RIP stream and components which are transferred by communication as a DASH stream.

In other words, in the description examples of the SPD and the MPD in FIG. 14, a component which is transferred as a DASH stream by communication which is the same as description content of the MPD is described in the SPD, in addition to a component which is transferred as an RIP stream in a broadcast. That is, the components which are described in the MPD are all described in the SPD. Then, a representation ID is designated for each component in the SPD and since the representation ID correlates with a representation ID of a representation element of the MPD, it is possible to associate communication components which are described in the SPD and the MPD.

That is, in the adaptive layer in FIG. 14, as shown by an arrow in the diagram, video components C2, C3, C4, and C5 of the SPD and video components R1, R2, R3, and R4 of the MPD are associated according to a representation ID. In addition, as shown by an arrow in the diagram, the audio components C7 and C8 of the SPD and audio components R5 and R6 of the MPD are associated according to a representation ID.

In addition, in the composite layer of the SPD, "CG" has a meaning of a component group, "V" has a meaning of video, and "A" has a meaning of audio. That is, video components C1 to C3 in a component group CG1 represented by "CG1-V" in the diagram are synthesized and form a synthesized component.

Here, a scalable attribute is designated as an attribute of the synthesis target in the composite layer. That is, "Base" is designated as an attribute value of the scalable attribute in the video component C1 and "Extended" is designated as an attribute value of the scalable attribute in the video component C2 and the video component C3. In addition, the bit rate of the video component C2 is, for example, a low bit rate such as 1 Mbps. On the other hand, the bit rate of the video component C3 is, for example, a high bit rate such as 10 Mbps.

Due to this, the video component C1, which is transferred in a broadcast by an RTP stream as a base stream, and the video component C2 or the video component C3, which is transferred by communication by a DASH stream as an extended stream, are synthesized and a synthesized component is obtained in the component group CG1. Here, a communication video component of one of the video component C2 and the video component C3 which are transferred as a DASH stream by communication and which have different bit rates is selected, for example, according to the congestion status of a communication path.

In addition, since only one communication video component C4 is prepared in a component group CG2 represented by "CG2-V" in the diagram, adaptive selection is not performed in the adaptive layer and in addition, synthesis is also not performed in the composite layer. Furthermore, since only one communication video component C5 is prepared in a component group CG3 represented by "CG3-V" in the diagram, adaptive selection is not performed in the adaptive layer and in addition, synthesis is also not performed in the composite layer.

Furthermore, since only one broadcast audio component C6 is prepared in a component group CG4 represented by "CG4-A" in the diagram, adaptive selection is not performed in the adaptive layer and in addition, synthesis is also not performed in the composite layer. In the same manner, in addition, a communication audio component C7 is selected every time with regard to a component group CG5 represented by "CG5-A" in the diagram, and the communication audio component C8 is selected every time with regard to a component group CG6 represented by "CG6-A".

On the other hand, in a composite layer of the MPD, "AS" has a meaning of an adaptation set element of an MPD. That is, in an adaptation set AS1 represented by "AS1-V" in the diagram, a communication video component of one of a video component R1 and a video component R2 which have different bit rates is selected, for example, according to the congestion status of a communication path.

In addition, since only one communication video component R3 is prepared in an adaptation set AS2 represented by "AS2-V" in the diagram, the video component R3 is selected every time. In the same manner, in addition, since only one communication video component R4 is prepared in an adaptation set AS3 represented by "AS3-V" in the diagram, the video component R4 is selected every time.

Furthermore, since only one communication audio component R5 is prepared in an adaptation set AS4 represented by "AS4-A" in the diagram, the audio component R5 is selected every time. In the same manner, in addition, since only one communication audio component R6 is prepared in an adaptation set AS5 represented by "AS5-A" in the diagram, the audio component R6 is selected every time.

When composite layers of the SPD and the MPD formed by the configuration described above are compared, while only communication components are described in an adaptation set element of the MPD, a component group for broadcast components is described in an SPD in addition to communication components. Then, an adaptation set ID is designated for each component group in the SPD and since the adaptation set ID correlates with an adaptation set ID of an adaptation set element of the MPD, it is possible to correlate the component groups of the SPD and the adaptation set element of the MPD.

That is, in the composite layer in FIG. 14, as shown by an arrow in the diagram, component groups CG1, CG2, and CG3 of the SPD and adaptation sets AS1, AS2, and AS3 of the MPD are associated according to an adaptation set ID. In addition, as shown by an arrow in the diagram, component groups CG5 and CG6 of an SPD and adaptation sets AS4 and AS5 of an MPD are associated according to an adaptation set ID.

In addition, in a selective layer of the SPD, "CC" has a meaning of a component category, "V" has a meaning of video, and "A" has a meaning of audio. That is, in a component category CC1 represented by "CC1-V" in the diagram, any one video component of the component groups CG1 to CG3 is selected. In addition, in a component category CC2 represented by "CC2-A" in the diagram, any one audio component of the component groups CG4 to CG6 is selected.

On the other hand, in a selective layer of the MPD, "group" has a meaning of a group. That is, in a group g1 represented by "group1-V" in the diagram, any one communication video component out of the adaptation sets AS1 to AS3 is selected. In addition, in a group g2 represented by "group2-A", any one communication audio component out of the adaptation sets AS4 and AS5 is selected.

Then, a group ID is designated for each component category in the SPD and since the group ID correlates with a group ID of the MPD, it is possible to correlate the component categories of the SPD and a group attribute of an adaptation set element of the MPD.

That is, in the selective layer in FIG. 14, as shown by an arrow in the diagram, the component category CC1 of the SPD and the group g1 of the MPD are associated according to a group ID. In addition, as shown by an arrow in the diagram, the component category CC2 of the SPD and the group g2 of the MPD are associated according to a group ID.

Above, as shown in the operative example in FIG. 14, a component of the SPD and a representation element of the MPD are mapped by a representation ID, a component group of the SPD and an adaptation set element of the MPD are mapped by an adaptation set ID, and a component category of the SPD and a group attribute of an adaptation set element of the MPD are mapped by a group ID. Due to this, since it is possible to perform an operation where the SPD and the MPD are mutually coordinated, it is possible to process components (objects) which are included in each layer in a cross-sectional manner by sharing parameters of each layer of the SPD and the MPD.

For example, in a case of the operative example in FIG. 14, since it is only possible to describe a communication component when with only an MPD, in the adaptation set AS1, it is only possible to express that one of the video component R1 and the video component R2 which have different bit rates is selected; however, by referring to a coordinated SPD, it is possible to recognize not only that one of the video component R1 (C2) and the video component R2 (C3) is selected but also that the selected communication video component is synthesized with the broadcast video component C1.

In addition, since the MPD is regulated in order to manage a streaming distribution which conforms to standards of an MPEG-DASH, description is only given of a communication component; however, by using the SPD, it is possible to describe a broadcast component in addition to a communication component. For example, in a case of using the MPD as the main, it is possible to acquire the information which is lacking as a complement by referring to the SPD. Here, since it is possible to describe both broadcast components and communication components in the SPD, the SPD may be used alone. In addition, since it is possible to describe communication components in the MPD, signaling information where a broadcast component and a communication component are described may be split by describing only broadcast components in the SPD.

(4) Syntax (Syntax of SPD)

FIG. 15 is a diagram which shows syntax of the SPD. An SPD is described, for example, in a markup language such as an XML. Here, in the elements and attributes in FIG. 15, "@" denotes the attributes. In addition, the elements and attributes which are indented are designated with respect to the upper elements thereof. In addition, the relationship between the elements and the attributes is the same in another syntax which will be described below.

As shown in FIG. 15, an Spd element is an upper element of a service ID attribute, a sp indicator attribute, a component layer descriptor element, a protocol version descriptor element, an NRT service descriptor element, a capability descriptor element, an icon descriptor element, an ISO 639 language descriptor element, a receiver targeting descriptor element, an associated service descriptor element, a content advisory descriptor element, and a component element.

A service ID is designated as a service ID attribute. Whether or not encryption is carried out for each service which is distinguished by a service ID is designated as a sp indicator attribute. The service is shown to be encrypted in a case in which "on" is designated as the sp indicator attribute and the service is shown to not be encrypted in a case in which "off" is designated.

Information relating to the component layer structure is designated as the component layer descriptor element. Information for indicating what kind of service is a data service is designated as the protocol version descriptor element.

Information relating to an NRT service is designated as the NRT service descriptor element. Information relating to a function (capability) which is requested for the receiving device which receives the provision of the NRT service is designated as the capability descriptor element.

Information which indicates an acquisition destination of an icon which is used in the NRT service is designated as the icon descriptor element. A language code of the NRT service is designated as the ISO 639 language descriptor element. Target information of the NRT service is designated as the receiver targeting descriptor element.

Information relating to an associated subordination service is designated as an associated service descriptor element. Information relating to a rating region is designated as the content advisory descriptor.

Various types of parameters are regulated in a service level by the descriptor elements described above in the SPD. In addition, various types of parameters are regulated in a component level by component elements below.

A component element is an upper element of a component ID attribute, a representation ID attribute, a sub representation level attribute, a component category attribute, a location type attribute, a component encryption attribute, a composite position attribute, a targeted screen attribute, a content advisory descriptor element, an AVC video descriptor element, a HEVC video descriptor element, an MPEG4 AAC audio descriptor element, an AC3 audio descriptor element, and a caption descriptor element.

A component ID is designated as the component ID attribute. A representation ID of a corresponding MPD is designated as a representation ID attribute. A component of the SPD and a representation element of the MPD are associated according to a representation ID.

A sub representation level is designated as a sub representation level attribute. For example, in a case in which components of a plurality of categories (for example, a video or an audio) are stored in each segment in a FLUTE session, the sub representation level is information for distinguishing the components.

Category information of a component is designated as the component category attribute. For example, "video", "audio", "caption", and "nrt" are designated as the category information. "Video" indicates a video component, "audio" indicates an audio component, and "caption" indicates a subtitles component. In addition, "nrt" indicates data of NRT content.

Type information of a location of a component is designated as the location type attribute. For example, "bb", "bca", and "bco" are designated as the type information. "bb" is an abbreviation of broadband and indicates that the component is distributed using communication. "bca" is an abbreviation of broadcast actual and indicates that a component is distributed using a broadcast and is distributed in the same service as the service where the SPD (SCS) is transferred. "bco" is an abbreviation of broadcast other and indicates that a component is distributed using a broadcast and is distributed in another service which is different from the service where the SPD (SCS) is transferred.

Whether or not encryption is carried out for each component which is distinguished by a component ID is designated as a component encryption attribute. The component is shown to be encrypted in a case in which "on" is designated as a component encryption attribute and the component is shown to not be encrypted in a case in which "off" is designated.

Information relating to the synthesis of components which is performed in a composite layer is designated as the composite position attribute. Information which corresponds to the attribute value of the composite type attribute of a component group element of the component layer descriptor (FIG. 16) is designated here. For example, in a case in which a scalable attribute is designated as the composite type attribute of the component group element, "base" is designated as a composite position attribute when the target component is a base stream. In addition, "enhancement" is designated as a composite position attribute when the target component is an extended stream.

Information relating to a display of a target device in a component unit is designated as the targeted screen attribute. For example, "primary" and "secondary" are designated as information relating to the display. "Primary" is designated in a case in which a video is displayed, for example, on a television set as a first display device. "Secondary" is designated in a case in which a video is displayed, for example, on a tablet terminal apparatus as a second display device. Rating information in a component unit is designated as the content advisory descriptor element.

In a case in which advanced video coding (AVC) is used as a method for encoding video data, video parameters are designated as the AVC video descriptor element. In addition, in a case in which high efficiency video coding (HEVC) is used as the method for encoding the video data, video parameters are designated as the HEVC video descriptor element. Here, the AVC and the HEVC are examples of a method for encoding video data, and in a case in which another encoding method is used, a corresponding video descriptor element is designated.

In a case in which MPEG4 advanced audio coding (AAC) is used as a method for encoding audio data, audio parameters are designated as the MPEG4 AAC audio descriptor element. In addition, in a case in which an audio code number 3 (AC3) is used as the method for encoding audio data, audio parameters are designated as the AC3 audio descriptor element. Here, the MPEG4 AAC and the AC3 are examples of a method for encoding audio data, and in a case in which another encoding method is used, a corresponding audio descriptor element is designated. A subtitles parameter is designated as the caption descriptor element.

Here, in the syntax of the SPD in FIG. 15, a protocol version descriptor element, an NRT service descriptor element, a capability descriptor element, an icon descriptor element, an ISO 639 language descriptor element, and a receiver targeting descriptor element are regulated for an NRT service.

In addition, regarding the number of occurrences (cardinality) of elements and attributes of the SPD shown in FIG. 15, only one of the element and the attribute is constantly designated in a case in which "1" is designated, and whether or not to designate the element or the attribute is arbitrary in a case in which "0..1" is designated. In addition, one or more of the elements and the attributes are designated in a case in which "1..n" is designated and whether or not to designate one or more of the elements or the attributes is arbitrary in a case in which "0..n" is designated. The meaning of the number of occurrences is the same as in another syntax which will be described below.

Next, description will be given of a specific configuration of descriptor elements which are described in an SPD in FIG. 15. Here, out of descriptor elements which are described in the SPD, description will be given of a component layer descriptor element as a representative.

(Component Layer Descriptor)

FIG. 16 is a diagram which shows syntax of a component layer descriptor. The component layer descriptor is described, for example, in a markup language such as an XML.

As shown in FIG. 16, information relating to a component layer configuration is designated as a component layer descriptor element. A component layer descriptor element is an upper element of a component category element. Information relating to a component category is designated as the component category element. The component category element is an upper element of a category attribute, an mpd group ID attribute, and a component group element.

Category information (a title) of a component is designated as the category attribute. For example, "video", "audio", "caption", and "nrt" are designated as the category information. "Video" indicates a video component, "audio" indicates an audio component, and "caption" indicates a subtitles component. In addition, "nrt" indicates data of NRT content.

A group ID of a corresponding MPD is designated as the mpd group ID attribute. Component categories of the SPD and a group attribute of an adaptation set element of the MPD are associated according to a group ID. Information relating to a component group is designated as a component group element.

A component group element is an upper element of an ID attribute, an adaptation set ID attribute, a default flag attribute, a mux ID attribute, an encryption attribute, a language attribute, a composite type attribute, a usage attribute, a stereoscope attribute, an audio channel config attribute, a target screen attribute, a viewpoint descriptor element, a content advisory descriptor element, and a component ID element.

A component group ID is designated as the ID attribute. An adaptation set ID of a corresponding MPD is designated as the adaptation set ID attribute. A component group of the SPD and an adaptation set element of the MPD are associated according to an adaptation set ID.

In a case in which a target component group is selected automatically (as default) when selecting a channel, "1" is designated as the default flag attribute. An ID of a combination between different component categories is designated as the mux ID attribute. For example, the same mux ID attribute is designated in the component group of the video and audio in the main view. Here, for the ID, the same ID is designated with respect to a combination of subset elements of the MPD. In a case in which a target component group is encrypted, "1" is designated as the encryption attribute. The language of a target component group is designated as the language attribute.

Type information of synthesis of components which is performed in a composite layer is designated as the composite type attribute. For example, it is possible to designate scalable, mixing (mix), tile, and the like as the type information. As described above, according to the type information which is designated here, the value of a composite position attribute of a component element in the SPD is designated (FIG. 15).

Information relating to the purpose of usage is designated as the usage attribute. For example, "vi", "hi", and "narration" are designated as the information relating to the purpose of usage. "vi" indicates a visual disturbance, "hi" indicates an auditory disturbance, and "narration" indicates narration. In a case of 3D in the information which indicates 3D or 2D, "1" is designated as the stereoscope attribute. Information which indicates a configuration of a sound channel is designated as the audio channel config attribute. "Monoral", "Stereo", "5.1ch", and "22.1ch" are designated as the information which indicates the configuration of the sound channel.

Information relating to a display of a target device in a component group unit is designated as the target screen attribute. For example, "primary" and "secondary" are designated as the information relating to the display. "Primary" is designated in a case in which a video is displayed, for example, on a television set as a first display device. "Secondary" is designated in a case in which a video is displayed, for example, on a tablet terminal apparatus as a second display device. Information relating to a view point is designated as a view point descriptor element. An ID and a title for each view point are designated as the information relating to the view point. Rating information in a component group unit is designated as the content advisory descriptor element. A component ID of a component which is included in a target component group is designated as the component ID element.

(Another Configuration of Syntax of SPD)

Here, in the syntax of the SPD in FIG. 15 described above, the component layer descriptor in FIG. 16 is arranged as a descriptor in a service level such that various types of parameters are regulated in two stages of a service level and a component level; however, description content of the component layer descriptor may be directly described in the SPD. Syntax of the SPD is shown in FIG. 17. Here, in a case in which elements or attributes which configure the SPD in FIG. 17 have a meaning of the same content as the elements or attributes which configure the SPD in FIG. 15, and description thereof will be omitted since the description is a repetition.

As shown in FIG. 17, the Spd element is an upper element of a service ID attribute, an sp indicator attribute, a protocol version descriptor element, an NRT service descriptor element, a capability descriptor element, an icon descriptor element, an ISO 639 language descriptor element, a receiver targeting descriptor element, an associated service descriptor element, a content advisory descriptor element, and a component category group element.

Information relating to a component category and a component group is designated as the component category group element. The component category group element is an upper element of a component category attribute, an mpd group ID attribute, and a component group element.

Category information of a component is designated as the component category attribute. For example, "video", "audio", "caption", and "nrt" are designated as the category information. "Video" indicates a video component, "audio" indicates an audio component, and "caption" indicates a subtitles component. In addition, "nrt" indicates data of NRT content.

A group ID of a corresponding MPD is designated as the mpd group ID attribute. Component categories of the SPD and a group attribute of an adaptation set element of the MPD are associated according to a group ID. Information relating to a component group is designated as the component group element.

A component group element is an upper element of an ID attribute, an adaptation set ID attribute, a default flag attribute, a mux ID attribute, an encryption attribute, a language attribute, a composite type attribute, a usage attribute, a stereoscope attribute, an audio channel config attribute, a target screen attribute, a viewpoint descriptor element, a content advisory descriptor element, and a component element. An adaptation set ID of a corresponding MPD is designated as the adaptation set ID attribute. A component group of the SPD and an adaptation set element of the MPD are associated according to an adaptation set ID.

A component element is an upper element of a component ID attribute, a representation ID attribute, a sub representation level attribute, a component category attribute, a location type attribute, a composite position attribute, an AVC video descriptor element, a HEVC video descriptor element, an MPEG4 AAC audio descriptor element, an AC3 audio descriptor element, and a caption descriptor element. A representation ID of a corresponding MPD is designated as the representation ID attribute. A component of the SPD and a representation element of the MPD are associated according to a representation ID.

As described above, in the SPD in FIG. 17, it is possible to perform an operation where the SPD and the MPD are mutually coordinated by mapping with the MPD according to a group ID, an adaptation set ID, and a representation ID such that parameters in a component category level and a component group level are regulated in addition to two stages of a service level and a component level. Here, the syntax of the SPD described above is one example and another syntax may be adopted.

<4. System Configuration>

(Configuration of Broadcast Communication System)

FIG. 18 is a diagram which shows a configuration of one embodiment of a broadcast communication system to which the present technique is applied.

As shown in FIG. 18, a broadcast communication system 1 is configured by a data providing server 10, a transmitting apparatus 20, a distribution server 30, and a receiving apparatus 40. In addition, the distribution server 30 and the receiving apparatus 40 are mutually connected via a network 90 such as the internet.

The data providing server 10 supplies various types of components such as video, audio, or subtitles to the transmitting apparatus 20 and the distribution server 30. Here, for example, in order to realize an adaptive streaming distribution in a service which supplies a television program, as components which configure the television program, a video component of 8 Mbps is supplied to the transmitting apparatus 20 and video components of 1 Mbps, 2 Mbps, 5 Mbps, 10 Mbps, and 20 Mbps are supplied to the distribution server 30.

The transmitting apparatus 20 transmits various types of components (for example, a video component of 8 Mbps) which are provided from the data providing server 10 by a broadcast wave of digital broadcasting. In addition, the transmitting apparatus 20 transmits a control signal (signaling information in FIG. 10) by a broadcast wave of digital broadcasting in addition to the components. Here, the control signal (signaling information in FIG. 10) may be distributed from a dedicated server or the like which is connected with the network 90.

The distribution server 30 distributes various types of components (for example, video components of 1 Mbps, 2 Mbps, 5 Mbps, 10 Mbps, and 20 Mbps) which are provided from the data providing server 10 to the receiving apparatus 40 via the network 90 according to a request from the receiving apparatus 40.

The receiving apparatus 40 receives a broadcast signal which is transmitted from the transmitting apparatus 20 and acquires a control signal (signaling information in FIG. 10). The receiving apparatus 40 acquires various types of components (for example, a video component of 8 Mbps) such as video, audio, or subtitles which are transmitted from the transmitting apparatus 20 according to the control signal. In addition, the receiving apparatus 40 acquires various types of components (for example, video components of 1 Mbps, 2 Mbps, 5 Mbps, 10 Mbps, and 20 Mbps) such as video, audio, or subtitles which are distributed from the distribution server 30 according to the control signal.

The receiving apparatus 40 displays a video of components of a video or subtitles on a display and outputs the sound of an audio component which is synchronized with the video from a speaker. Here, for example, every set period (for example, 10 seconds), an optimum video component is adaptively selected from a broadcast video component of 8 Mbps and communication video components of 1 Mbps, 2 Mbps, 5 Mbps, 10 Mbps, and 20 Mbps, switched, and an adaptive streaming distribution is realized.

Here, the receiving apparatus 40 may be configured as a single body including a display or a speaker or may be incorporated into a television set, a video recorder, or the like.

The broadcast communication system 1 is configured as described above. Next, description will be given of the detailed configuration of each apparatus which configures the broadcast communication system 1 in FIG. 18.

(Configuration of Transmitting Apparatus)

FIG. 19 is a diagram which shows a configuration of one embodiment of a transmitting apparatus to which the present technique is applied.

As shown in FIG. 19, the transmitting apparatus 20 is configured by a component acquiring section 201, a control signal acquiring section 202, a Mux 203, and a transmitting section 204.

The component acquiring section 201 acquires various types of components from the data providing server 10 and supplies the components to the Mux 203. The control signal acquiring section 202 acquires a control signal (signaling information in FIG. 10) from an external server such as the data providing server 10 or an internal storage and supplies the control signal to the Mux 203.

The Mux 203 multiplexes various types of components from the component acquiring section 201 and a control signal from the control signal acquiring section 202, generates a BBP stream, and supplies the BBP stream to the transmitting section 204. The transmitting section 204 transmits the BBP stream which is supplied from the Mux 203 via an antenna 205 as a broadcast signal.

(Configuration of Distribution Server)

FIG. 20 is a diagram which shows a configuration of one embodiment of a distribution server to which the present technique is applied.

As shown in FIG. 20, the distribution server 30 is configured by a control section 301, a component acquiring section 302, an accumulation section 303, and a communication section 304.

The control section 301 controls an operation of each section of the distribution server 30.

The component acquiring section 302 acquires various types of components from the data providing server 10 and supplies the components to the control section 301. The control section 301 accumulates various types of components from the component acquiring section 302 in the accumulation section 303. Due to this, various types of components from the data providing server 10 are accumulated in the accumulation section 303.

The communication section 304 exchanges various types of data with the receiving apparatus 40 via the network 90 under the control of the control section 301. In a case in which the communication section 304 receives a request for the distribution of a stream (a component) from the receiving apparatus 40, the control section 301 reads out a component which corresponds to the request from the accumulation section 303. The control section 301 controls the communication section 304 and distributes a stream formed of components which are read out from the accumulation section 303 to the receiving apparatus 40 via the network 90.

(Configuration of Receiving Apparatus)

Figure 21:
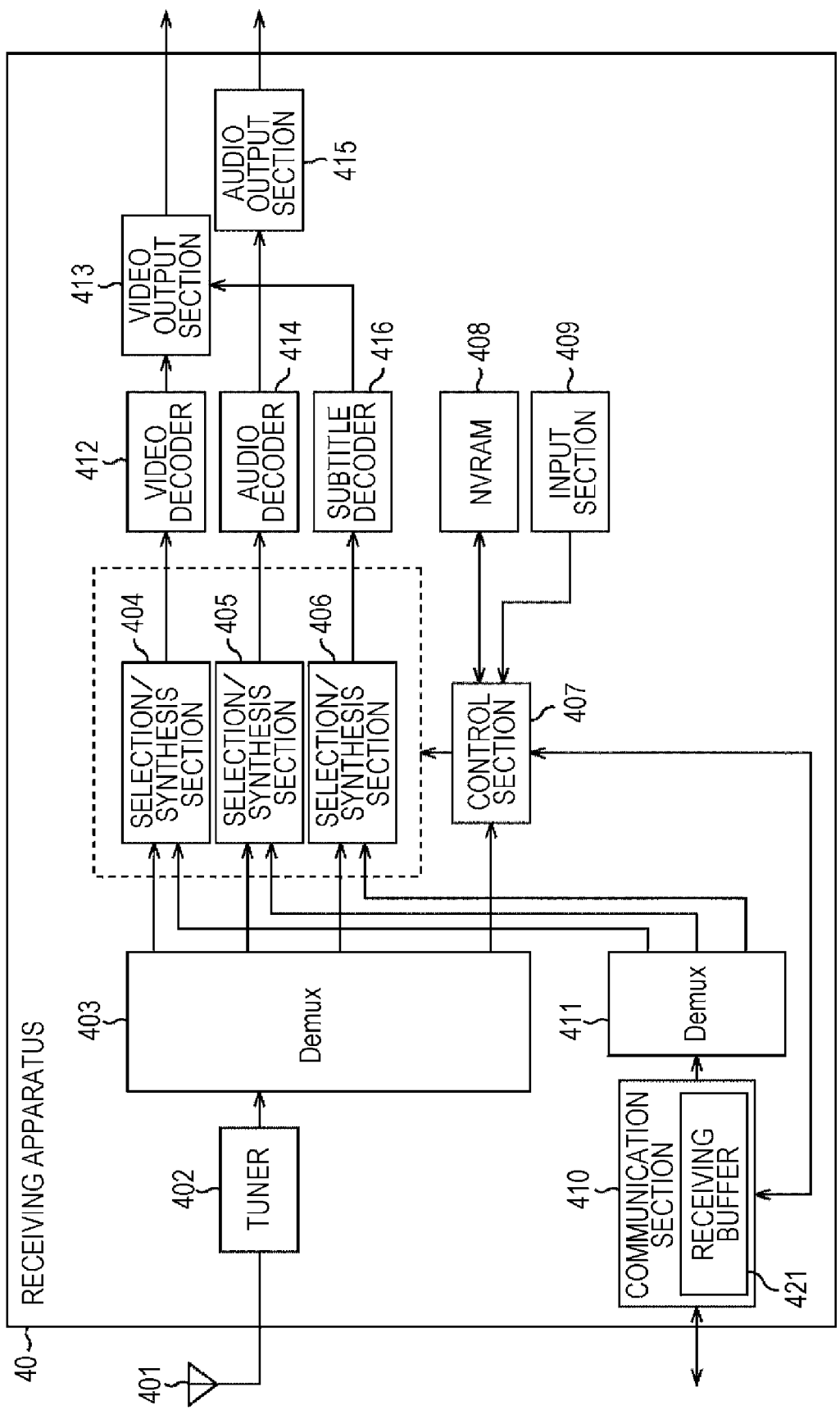
FIG. 21 is a diagram which shows a configuration of one embodiment of a receiving apparatus to which the present technique is applied.

FIG. 21 is a diagram which shows a configuration of one embodiment of a receiving apparatus to which the present technique is applied.

As shown in FIG. 21, the receiving apparatus 40 is configured by a tuner 402, a Demux 403, a selection/synthesis section 404, a selection/synthesis section 405, a selection/synthesis section 406, a control section 407, an NVRAM 408, an input section 409, a communication section 410, a Demux 411, a video decoder 412, a video output section 413, an audio decoder 414, an audio output section 415, and a subtitles decoder 416.

The tuner 402 extracts and demodulates a broadcast signal of a service for which channel selection is instructed from a broadcast signal which is received by an antenna 401 and supplies a BBP stream which is obtained as a result to the Demux 403.

The Demux 403 separates the BBP stream which is supplied from the tuner 402 into each component and a control signal, supplies each of the components to the selection/synthesis sections 404 to 406, and supplies the control signal to the control section 407. Here, as components, a video component, an audio component, and a subtitles component are separated and are respectively supplied to the selection/synthesis section 404, the selection/synthesis section 405, and the selection/synthesis section 406.

The control section 407 controls an operation of each section of the receiving apparatus 40. The NVRAM 408 is a non-volatile memory and records various types of data under the control of the control section 407. In addition, the control section 407 controls a selection/synthesis process which is performed by the selection/synthesis sections 404 to 406 based on a control signal (signaling information in FIG. 10) which is supplied from the Demux 403.

The input section 409 supplies an operation signal to the control section 407 according to an operation of the user. The control section 407 controls an operation of each section of the receiving apparatus 40 based on the operation signal from the input section 409.

The communication section 410 exchanges various types of data with the distribution server 30 via the network 90 under the control of the control section 407. The communication section 410 supplies a stream which is received from the distribution server 30 to the Demux 411. At that time, the communication section 410 receives a stream which is distributed from the distribution server 30 while buffering stream data in the receiving buffer 421 which is provided therein.

The Demux 411 separates a stream which is supplied from the communication section 410 into each of the components and supplies the components to the selection/synthesis sections 404 to 406. Here, out of the components after the separation, a video component is supplied to the selection/synthesis section 404, an audio component is supplied to the selection/synthesis section 405, and a subtitles component is supplied to the selection/synthesis section 406.

The selection/synthesis section 404 performs a selection/synthesis process (for example, a process of each layer in the video component layer in FIG. 4) with respect to a video component from the Demux 403 and a video component from the Demux 411 under the control of the control section 407 and supplies a video component which is obtained as a result of the process to the video decoder 412.

The video decoder 412 decodes a video component which is supplied from the selection/synthesis section 404 and supplies video data which is obtained as a result to the video output section 413. The video output section 413 outputs the video data which is supplied from the video decoder 412 to a display in a rear stage (which is not shown in the diagram). Due to this, for example, a video of a television program or the like is displayed on a display.

The selection/synthesis section 405 performs a selection/synthesis process (for example, a process of each layer in the audio component layer in FIG. 4) with respect to an audio component from the Demux 403 and an audio component from the Demux 411 under the control of the control section 407 and supplies an audio component which is obtained as a result of the process to the audio decoder 414.

The audio decoder 414 decodes an audio component which is supplied from the selection/synthesis section 405 and supplies audio data which is obtained as a result to the audio output section 415. The audio output section 415 supplies the audio data which is supplied from the audio decoder 414 to a speaker in a rear stage (which is not shown in the diagram). Due to this, for example, sound which corresponds to the video of a television program is output from a speaker.

The selection/synthesis section 406 performs a selection/synthesis process (for example, a process of each layer in the subtitles component layer in FIG. 4) with respect to a subtitles component from the Demux 403 and a subtitles component from the Demux 411 under the control of the control section 407 and supplies a subtitles component which is obtained as a result of the process to the subtitles decoder 416.

The subtitles decoder 416 decodes a subtitles component which is supplied from the selection/synthesis section 406 and supplies subtitles data which is obtained as a result to the video output section 413. In a case in which subtitles data is supplied from the subtitles decoder 416, the video output section 413 synthesizes the subtitles data with video data from the video decoder 412 and supplies the result to a display in a rear stage (which is not shown in the diagram). Due to this, subtitles are superimposed on the video of the television program and displayed on the display.

Here, in the receiving apparatus 40 in FIG. 21, for convenience of description, a configuration where the selection/synthesis sections 404 to 406 are provided at a front stage of each decoder is shown; however, depending on the content of the selection/synthesis process, a configuration where the selection/synthesis sections 404 to 406 are provided at a rear stage of each decoder may be adopted.

<5. Flow of Specific Processes Executed in Each Apparatus>

Figure 22:
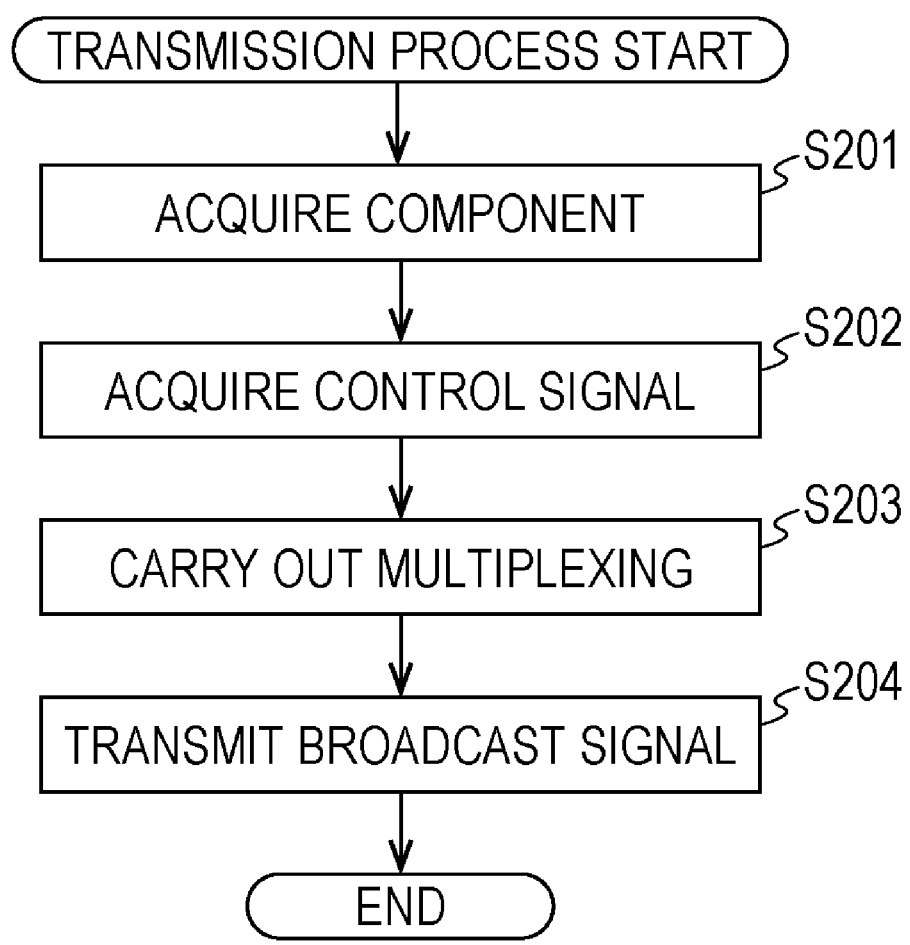
FIG. 22 is a flowchart which illustrates a transmission process.
Figure 23:
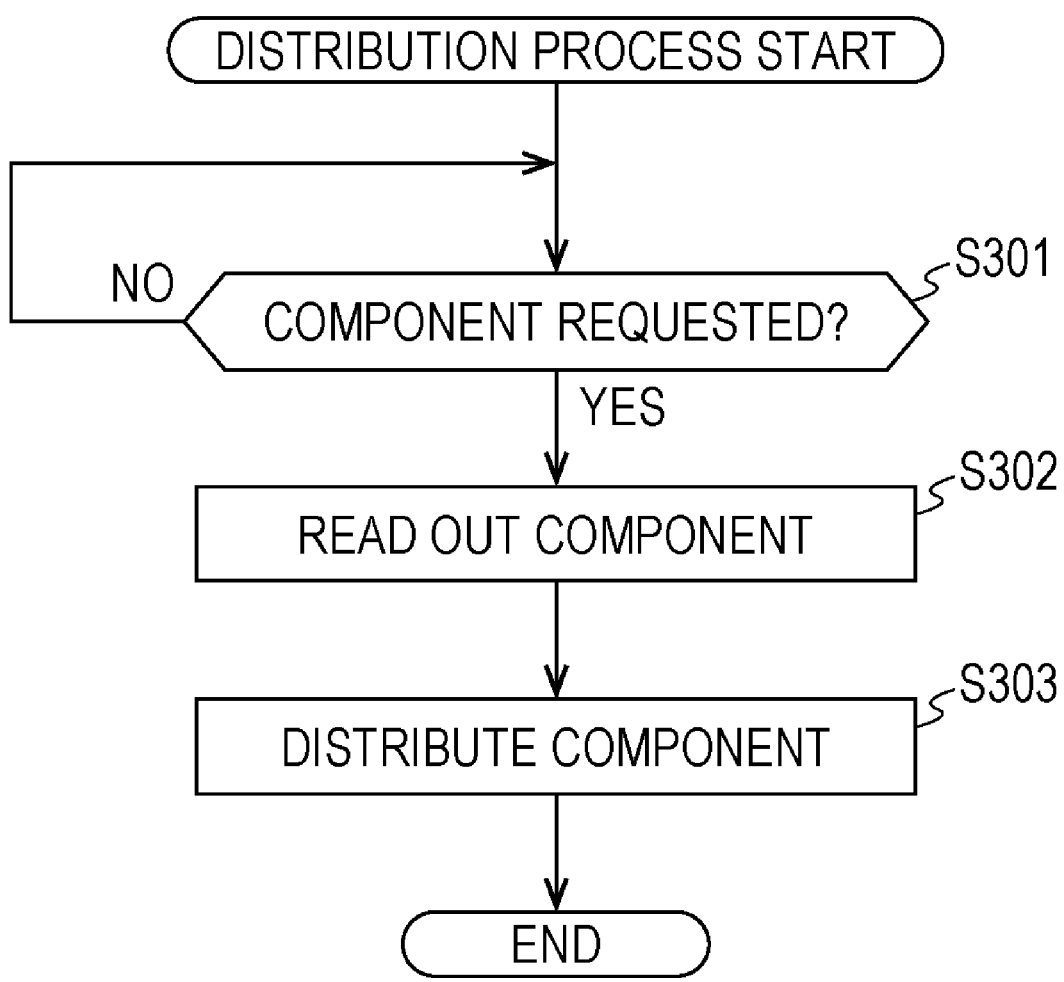
FIG. 23 is a flowchart which illustrates a distribution process.
Figure 24:
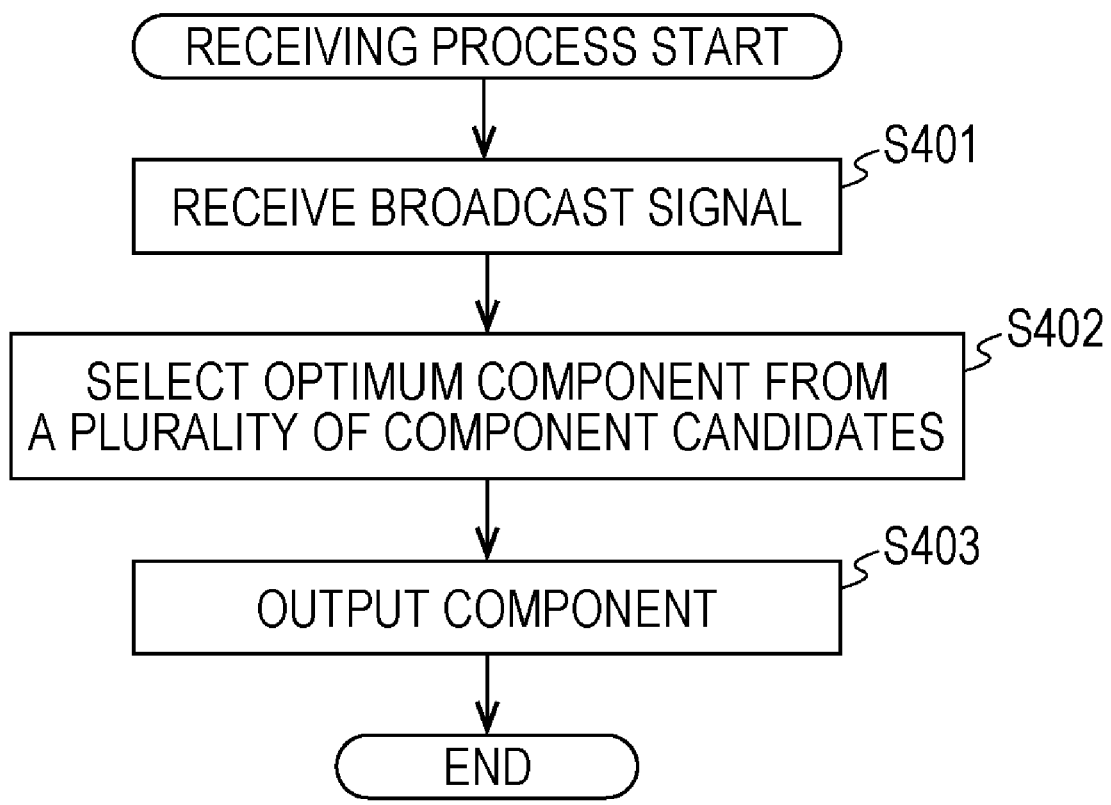
FIG. 24 is a flowchart which illustrates a receiving process.

Next, description will be given of a flow of a process which is executed in each apparatus which configures the broadcast communication system 1 in FIG. 18 with reference to the flowcharts of FIG. 22 to FIG. 24.

(Transmission Process)

Firstly, description will be given of a transmission process which is executed by the transmitting apparatus 20 in FIG. 18 with reference to the flowchart of FIG. 22.

In step S201, the component acquiring section 201 acquires various types of components from the data providing server 10 and supplies the components to the Mux 203. In step S202, the control signal acquiring section 202 acquires a control signal (signaling information in FIG. 10) from an external server or the like and supplies the control signal to the Mux 203.

In step S203, the Mux 203 multiplexes various types of components from the component acquiring section 201 and a control signal from the control signal acquiring section 202, generates a BBP stream, and supplies the BBP stream to the transmitting section 204. In step S204, the transmitting section 204 transmits the BBP stream which is supplied from the Mux 203 via the antenna 205 as a broadcast signal. When the process of step S204 ends, the transmission process in FIG. 22 ends.

Above, description was given of a transmission process. In the transmission process, various types of components and a control signal which are supplied from the data providing server 10 are transmitted by a broadcast wave.

(Distribution Process)

Next, description will be given of a distribution process which is executed by the distribution server 30 in FIG. 18 with reference to the flowchart in FIG. 23. However, various types of components which are acquired from the data providing server 10 are accumulated in the accumulation section 303 in the distribution server 30.

In step S301, the control section 301 constantly monitors the communication section 304 and determines whether a component is requested from the receiving apparatus 40 via the network 90. In step S301, the process waits for a request for a component from the receiving apparatus 40 and proceeds to step S302.

In step S302, the control section 301 reads out a component from the accumulation section 303 according to the request from the receiving apparatus 40. In step S303, the control section 301 controls the communication section 304 and distributes the component (stream) which is read out from the accumulation section 303 to the receiving apparatus 40 via the network 90. When the process of step S303 ends, the distribution process in FIG. 23 ends.

Above, description was given of a distribution process. In the distribution process, according to a request from the receiving apparatus 40, various types of components (streams) which are provided from the data providing server 10 are distributed via the network 90.

(Receiving Process)

Finally, description will be given of a receiving process which is executed by the receiving apparatus 40 in FIG. 18 with reference to the flowchart in FIG. 24. The receiving process is executed, for example, in a case such as where the receiving apparatus 40 is started and a channel selection instruction is carried out due to an operation of a remote controller by the user.

In step S401, the tuner 402 receives a broadcast signal via the antenna 401 and extracts and demodulates a broadcast signal of a service for which channel selection is instructed from the broadcast signal. In addition, the Demux 403 separates a BBP stream from the tuner 402 into a component and a control signal.

In step S402, the control section 407 selects an optimum component from a plurality of component candidates based on a control signal (signaling information in FIG. 10) from the Demux 403. In detail, since signaling information in FIG. 10 is acquired as a control signal in the control section 407, in the choices, firstly, an operation is controlled according to a selection determination on the basis of the number of components to be selected in a topAttribute attribute.

For example, in a case in which a selection determination is a user selection, the control section 407 displays information, which is designated as an attribute of a fixed selection target in each selective component group of a selective layer of the uppermost hierarchy, on a GUI screen and the user selects the selective component group (component). In addition, for example, in a case in which the selection determination is automatic selection by the receiving device, the control section 407 selects a selective component group (component) for each selective component group of a selective layer of the uppermost hierarchy based on information which is designated as an attribute of the fixed selection target.

The component selection process is basically executed for each category of a component such as a video or an audio; however, a selective component group (component) is selected by moving to a new category in a case in which a view tag is designated as an attribute of a fixed selection target.

Next, in a case in which a plurality of composite component group elements are present in the selected selective component group (component), the control section 407 selects a plurality of components on which a designated component synthesis is to be performed from components of an adaptive selection target of an adaptive layer of a lower hierarchy in a composite layer. Then, the control section 407 controls the selection/synthesis sections 404 to 406, uses a plurality of components which are adaptively selected, and performs a synthesis process.

Here, for example, in a case in which scalable is designated as an attribute of a synthesis target in a composite component group, a base stream which is transferred in a broadcast and an extended stream which is transferred by communication are synthesized. In addition, for example, in a case in which 3D is designated as an attribute in a composite component group, a video for a right eye which is transferred in a broadcast and a video for a left eye which is transferred by communication are synthesized.

Here, description was given of a case in which a plurality of composite component group elements are present; however, in a case in which there is only one composite component group element, in a composite layer, optimum components are adaptively and successively selected from components of an adaptive selection target of an adaptive layer of a lower hierarchy. In addition, in a case in which there is only one component of an adaptive selection target in an adaptive layer, this component is selected every time. Furthermore, here, a component of the SPD and a representation element of the MPD are mapped by a representation ID, a component group of the SPD and an adaptation set element of the MPD are mapped by an adaptation set ID, a component category of the SPD and a group attribute of an adaptation set element of the MPD are mapped by a group ID, and the SPD and the MPD are mutually coordinated. Due to this, it is possible to process components (objects) which are included in each layer in a cross-sectional manner by sharing parameters of each layer of the SPD and the MPD.

When an optimum component is selected by the process in step S402, the process proceeds to step S403. In step S403, the video output section 413 displays a video, which corresponds to the component of video or subtitles selected by the process in step S402, on a display. In addition, in step S403, the audio output section 415 outputs a sound, which corresponds to an audio component selected by the process in step S402, from a speaker. When the process in step S403 ends, the receiving process in FIG. 24 ends.

Above, description was given of a receiving process. In the receiving process, based on a control signal (signaling information in FIG. 10), an optimum component is selected from a plurality of receivable component candidates in a broadcast or by communication and presented. Due to this, for example, in a case of selecting a desired television program, the user is able to watch and listen to video or sound which corresponds to the optimum component which is selected from the plurality of receivable component candidates.

Here, in the above description, "D", which is an abbreviation of Description, is used as the title of the signaling data; however, there are cases where "T", which is an abbreviation of Table, is used. For example, there is a case in which the service configuration description (SCD) is described as a service configuration table (SCT). In addition, for example, there is a case in which the service parameter description (SPD) is described as a service parameter table (SPT). However, the difference between the titles is a format difference between "Description" and "Table" and the substantial content of each signaling data is not different.

<6. Configuration of Computer>

Figure 25:
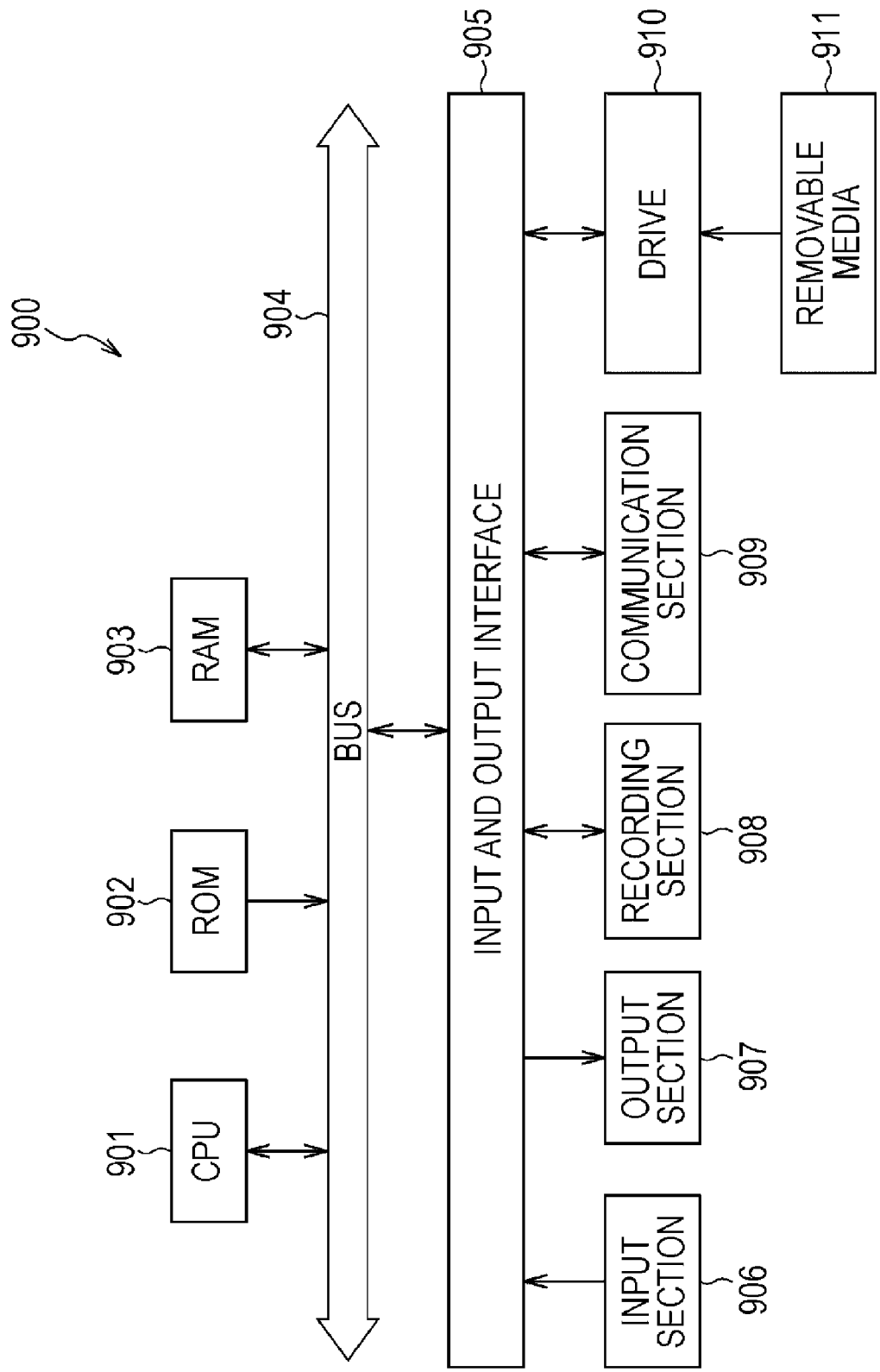
FIG. 25 is a diagram which shows a configuration example of a computer.

The series of processes described above is able to be executed by hardware and is also able to be executed by software. In a case of executing the series of processes by software, a program which configures the software is installed on a computer. FIG. 25 is a diagram which shows a configuration example of hardware of a computer which executes the series of processes described above using a program.

In a computer 900, a central processing unit (CPU) 901, a read only memory (ROM) 902, and a random access memory (RAM) 903 are connected to each other by a bus 904. An input and output interface 905 is further connected with the bus 904. An input section 906, an output section 907, a recording section 908, a communication section 909, and a drive 910 are connected with the input and output interface 905.

The input section 906 is formed of a keyboard, a mouse, a microphone, and the like. The output section 907 is formed of a display, a speaker, or the like. The recording section 908 is formed of a hard disk, a non-volatile memory, or the like. The communication section 909 is formed of a network interface and the like. The drive 910 drives a removable media 911 such as a magnetic disk, an optical disc, a magneto-optical disc, or a semiconductor memory.

In the computer 900 which is configured as described above, the series of processes described above is performed by the CPU 901 loading a program which is stored in the ROM 902 or the recording section 908 into the RAM 903 via the input and output interface 905 and the bus 904 and executing the program.

For example, it is possible to record the program executed by the computer 900 (the CPU 901) on the removable media 911 as a package media or the like to provide the program. In addition, it is possible to provide a program via a wired or wireless transfer medium such as a local area network, the internet, or digital satellite broadcasting.

In the computer 900, it is possible to install a program on the recording section 908 via the input and output interface 905 by mounting the removable media 911 on the drive 910. In addition, it is possible to receive a program in the communication section 909 via a wired or wireless transfer medium and install the program in the recording section 908. In addition thereto, it is possible to install a program on the ROM 902 or the recording section 908 in advance.

Here, in the present specification, the processes which the computer performs according to the program are not necessarily performed in time series in the described order as in the flowchart. That is, the processes which the computer performs according to the program include processes which are executed simultaneously or individually (for example, a simultaneous process or a process according to an object). In addition, the program may be processed by one computer (processor), or may be dispersed and processed by a plurality of computers.

Here, embodiments of the present technique are not limited to the embodiments described above and various types of changes are possible within a range which does not depart from the gist of the present technique.

In addition, the present technique is able to have the following configurations.

(1) A receiving apparatus including circuitry configured to receive a digital broadcast signal which uses an internet protocol (IP) transfer method. Based on control information included in the digital broadcast signal, acquire at least one of a broadcast component or a communication component, and control an operation of each section which performs a predetermined process relating to the acquired at least one component. The broadcast component and the communication component are associated with a component hierarchy including a first hierarchy level, a second hierarchy level, and a third hierarchy level for each component category, the third hierarchy level is for adaptively selecting the broadcast component or the communication component, the second hierarchy level is for synthesizing the component which is adaptively selected in the third hierarchy level and a component which is not a target in the third hierarchy into one synthesized component, and the first hierarchy level is for selecting one of the synthesized component which is synthesized in the second hierarchy level, the component which is adaptively selected in the third hierarchy level, and a component which is not a target in the second hierarchy level and the third hierarchy level.

(2) The receiving apparatus according to (1), in which the control information includes information for managing the communication component in addition to the broadcast component.

(3) The receiving apparatus according to (1) or (2), in which the control information includes a media presentation description (MPD) which conforms to the moving picture expert group-dynamic adaptive streaming over HTTP (MPEG-DASH) standard, a first identifier for associating a component and a representation element of the MPD, a second identifier for associating a group of components and an adaptation set element of the MPD, and a third identifier for associating a component category and a group attribute of an adaptation set element of the MPD.

(4) The receiving apparatus according to any one of (1) to (3), in which the control information includes first management information for managing the broadcast component which is included in the digital broadcast signal and second management information for managing the communication component which is transferred via a communication network.

(5) The receiving apparatus according to any one of (1) to (4), in which the control information describes a parameter relating to at least one of a specific service or a component of the service, and a descriptor which describes information relating to an associated component hierarchy of the component is arranged as the parameter relating to the specific service.

(6) The receiving apparatus according to any one of (1) to (4), in which the control information describes parameters relating to a specific service, a component of the service, a group of components, and the component category, and information relating to a component hierarchy associated with the component is described.

(7) The receiving apparatus according to any one of (1) to (4), in which the control information includes information relating to a synthesis of a plurality of components in the second hierarchy level.

(8) The receiving apparatus according to (3), in which the control information includes a fourth identifier for a combination between different component categories with respect to the group of components.

(9) The receiving apparatus according to any one of (1) to (8), in which the control information is transferred in a layer above an IP layer according to a protocol hierarchy of the IP transfer method, and a common IP address is assigned to broadcast components of each service in the control information.

(10) A receiving method of a receiving apparatus, including receiving a digital broadcast signal which uses an IP transfer method. Based on control information included in the digital broadcast signal, acquiring, by circuitry of the receiving apparatus, at least one of a broadcast component or a communication component, and controlling, by the circuitry, an operation of each section of the receiving apparatus which performs a predetermined process relating to the acquired at least one component. The broadcast component and the communication component are associated with a component hierarchy including a first hierarchy level, a second hierarchy level, and a third hierarchy level for each component category, the third hierarchy level is for adaptively selecting the broadcast component or the communication component, the second hierarchy level is for synthesizing the component which is adaptively selected in the third hierarchy level and a component which is not a target in the third hierarchy into one synthesized component, and the first hierarchy level is for selecting one of the synthesized component which is synthesized in the second hierarchy level, the component which is adaptively selected in the third hierarchy level, and a component which is not a target in the second hierarchy level and the third hierarchy level.

(11) A transmitting apparatus including circuitry configured to acquire control information; acquire a broadcast component of a service; and transmit the control information in addition to the broadcast component in a digital broadcast signal which uses an IP transfer method. The broadcast component and a communication component are associated with a component hierarchy structure including a first hierarchy level, a second hierarchy level, and a third hierarchy level for each component category, the third hierarchy level is for adaptively selecting the broadcast component or the communication component, the second hierarchy level is for synthesizing the component which is adaptively selected in the third hierarchy level and a component which is not a target in the third hierarchy level into one component, and the first hierarchy level is for selecting one of the component which is synthesized in the second hierarchy level, the component which is adaptively selected in the third hierarchy level, and a component which is not a target in the second hierarchy level and the third hierarchy level.

(12) The transmitting apparatus according to (11), in which the control information includes information for managing the communication component in addition to the broadcast component.

(13) The transmitting apparatus according to (11) or (12), in which the control information includes a media presentation description (MPD) which conforms to the moving picture expert group-dynamic adaptive streaming over HTTP (MPEG-DASH) standard, a first identifier for associating a component and a representation element of the MPD, a second identifier for associating a group of components and an adaptation set element of the MPD, and a third identifier for associating a component category and a group attribute of an adaptation set element of the MPD.

(14) The transmitting apparatus according to any one of (11) to (13), in which the control information includes first management information for managing at least the broadcast component which is included in the digital broadcast signal and second management information for managing only the communication component which is transferred via a communication network.

(15) The transmitting apparatus according to any one of (11) to (14), in which the control information describes a parameter relating to at least one of a specific service or a component of the service, and a descriptor which describes information relating to a component hierarchy associated with the component is arranged as the parameter relating to the specific service.

(16) The transmitting apparatus according to any one of (11) to (14), in which the control information describes parameters relating to a specific service, a component of the service, a group of components, and the component category, and information relating to a component hierarchy associated with the component is described.

(17) The transmitting apparatus according to any one of (11) to (14), in which the control information includes information relating to a synthesis of a plurality of components in the second hierarchy level.

(18) The transmitting apparatus according to (13), in which the control information includes a fourth identifier for a combination between different component categories with respect to the group of components.

(19) The transmitting apparatus according to any one of (11) to (18), in which the control information is transferred in a layer above an IP layer according to a protocol hierarchy of the IP transfer method, and a common IP address is assigned to the broadcast component of each service in the control information.

(20) A transmitting method including acquiring control information; acquiring, by circuitry of the transmitting apparatus, a broadcast component of a service, and transmitting, by the circuitry, the control information in addition to the broadcast component in a digital broadcast signal which uses an IP transfer method. The broadcast component and a communication component are associated with a component hierarchy structure including a first hierarchy level, a second hierarchy level, and a third hierarchy level for each component category, the third hierarchy level is for adaptively selecting the broadcast component or the communication component, the second hierarchy level is for synthesizing the component which is adaptively selected in the third hierarchy level and a component which is not a target in the third hierarchy level into one component, and the first hierarchy level is for selecting one of the component which is synthesized in the second hierarchy level, the component which is adaptively selected in the third hierarchy level, and a component which is not a target in the second hierarchy level and the third hierarchy level.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Broadcast communication system
10 Data providing server
20 Transmitting apparatus
30 Distribution server
40 Receiving apparatus
90 Network
201 Component acquiring section
202 Control signal acquiring section
203 Mux
204 Transmitting section
301 Control section
302 Component acquiring section
303 Accumulation section
304 Communication section
402 Tuner
403 Demux
404, 405, 406 Selection/synthesis section
407 Control section
408 NVRAM
409 Input section
410 Communication section
411 Demux
412 Video decoder
413 Video output section
414 Audio decoder
415 Audio output section
416 Subtitles decoder
421 Receiving buffer
900 Computer
901 CPU

The invention claimed is:

1. A receiving apparatus, comprising:
circuitry configured to
receive a digital broadcast signal which uses an internet protocol (IP) transfer method, the digital broadcast signal including control information that manages a plurality of components;
based on the control information included in the digital broadcast signal, output a graphical user interface (GUI) screen for displaying at least one of selection targets;
receive, from a remote controller, a user selection indicating a selected one of the selection targets;
acquire one or more selected components corresponding to the selected one of the selection targets via a broadcast network or a communication network according to the control information; and
output the one or more selected components according to the control information,
wherein
the plurality of components managed by the control information is associated with a component hierarchy including a first hierarchy level, a second hierarchy level, and a third hierarchy level for each component category,
the third hierarchy level is for adaptively selecting an adaptive component from a subset of the plurality of components according to the control information,
the second hierarchy level is for synthesizing the adaptive component which is adaptively selected in the third hierarchy level and a first component which is not included in the third hierarchy into a synthesized component according to the control information, and
the first hierarchy level is for selecting a selective component from the synthesized component, the adaptive component, or a second component which is not included in the second hierarchy level and the third hierarchy level according to the control information.

2. The receiving apparatus according to claim 1, wherein the control information includes information for managing at least one component transmitted via the broadcast network and at least one component transmitted via the communication network.

3. The receiving apparatus according to claim 2, wherein the control information includes a media presentation description (MPD) which conforms to the moving picture expert group-dynamic adaptive streaming over HTTP (MPEG-DASH) standard, a first identifier for associating a component and a representation element of the MPD, a second identifier for associating a group of components and an adaptation set element of the MPD, and a third identifier for associating a component category and a group attribute of an adaptation set element of the MPD.

4. The receiving apparatus according to claim 1, wherein the control information includes first management information for managing at least one component transmitted via the broadcast network and second management information for managing at least one component transmitted via the communication network.

5. The receiving apparatus according to claim 1, wherein the control information describes a parameter relating to at least one of a specific service or a component of the service, and a descriptor which describes information relating to an associated component hierarchy of the component is arranged as the parameter relating to the specific service.

6. The receiving apparatus according to claim 1, wherein the control information describes parameters relating to a specific service, a component of the service, a group of components, and the component category, and the control information further describes information relating to a component hierarchy associated with the component.

7. The receiving apparatus according to claim 1,
wherein the selection targets correspond to selections for selecting the selective component identified in the first hierarchy level.

8. The receiving apparatus according to claim 1,
wherein the selected one of the selection targets is identified in the control information as including at least one component transmitted via the communication network.

9. The receiving apparatus according to claim 1, wherein the GUI screen comprises a plurality of information items relating to an attribute of the at least one of the selection targets.

10. A receiving method of a receiving apparatus, the method comprising:

receiving a digital broadcast signal which uses an IP transfer method, the digital broadcast signal including control information that manages a plurality of components;

based on the control information included in the digital broadcast signal, output a graphical user interface (GUI) screen for displaying at least one of selection targets;

receiving, from a remote controller, a user selection indicating a selected one of the selection targets;

acquiring, by circuitry of the receiving apparatus, one or more selected components corresponding to the selected one of the selection targets via a broadcast network or a communication network according to the control information; and outputting the one or more selected components according to the control information, wherein the plurality of components managed by the control information is associated with a component hierarchy including a first hierarchy level, a second hierarchy level, and a third hierarchy level for each component category, the third hierarchy level is for adaptively selecting an adaptive component from a subset of the plurality of components according to the control information, the second hierarchy level is for synthesizing the adaptive component which is adaptively selected in the third hierarchy level and a first component which is not included in the third hierarchy into a synthesized component according to the control information, and the first hierarchy level is for selecting a selective component from the synthesized component, the adaptive component, or a second component which is not included in the second hierarchy level and the third hierarchy level according to the control information.

11. A transmitting apparatus comprising:
circuitry configured to
acquire control information that manages a plurality of components; and transmit the control information in a digital broadcast signal which uses an IP transfer method, wherein the control information includes information to cause output of a graphical user interface (GUI) screen for displaying at least one of selection targets, and cause acquisition of one or more selected components corresponding to a selected one of the selection targets via a broadcast network or a communication network, the plurality of components managed by the control information is associated with a component hierarchy structure including a first hierarchy level, a second hierarchy level, and a third hierarchy level for each component category, the third hierarchy level is for adaptively selecting an adaptive component from a subset of the plurality of components according to the control information, the second hierarchy level is for synthesizing the adaptive component which is adaptively selected in the third hierarchy level and a first component which is not included in the third hierarchy level into a synthesized component according to the control information, and the first hierarchy level is for selecting a selective component from the synthesized component, the adaptive component, or a second component which is not included in the second hierarchy level and the third hierarchy level according to the control information.

12. The transmitting apparatus according to claim 11,
wherein the control information includes information for managing at least one component transmitted via the broadcast network and at least one component transmitted via the communication network.

13. The transmitting apparatus according to claim 12,
wherein the control information includes a media presentation description (MPD) which conforms to the moving picture expert group-dynamic adaptive streaming over HTTP (MPEG-DASH) standard, a first identifier for associating a component and a representation element of the MPD, a second identifier for associating a group of components and an adaptation set element of the MPD, and a third identifier for associating a component category and a group attribute of an adaptation set element of the MPD.

14. The transmitting apparatus according to claim 11,
wherein the control information includes first management information for managing at least one component transmitted via the broadcast network and second management information for managing at least one component transmitted via the communication network.

15. The transmitting apparatus according to claim 11,
wherein
the control information describes a parameter relating to at least one of a specific service or a component of the service, and a descriptor which describes information relating to a component hierarchy associated with the component is arranged as the parameter relating to the specific service.

16. The transmitting apparatus according to claim 11,
wherein
the control information describes parameters relating to a specific service, a component of the service, a group of components, and the component category, and the control information further describes information relating to a component hierarchy associated with the component.

17. The transmitting apparatus according to claim 11,
wherein the selection targets correspond to selections for selecting the selective component identified in the first hierarchy level.

18. The transmitting apparatus according to claim 11, wherein the selected one of the selection targets is identified in the control information as including at least one component transmitted via the communication network.

19. The transmitting apparatus according to claim 11, wherein
the GUI screen comprises a plurality of information items relating to an attribute of the at least one of the selection targets.

20. A transmitting method for a transmitting apparatus, the method comprising:
acquiring control information that manages a plurality of components; and
transmitting, by circuitry of the transmitting apparatus, the control information in a digital broadcast signal which uses an IP transfer method,
wherein
the control information includes information to
cause output of a graphical user interface (GUI) screen for displaying at least one of selection targets, and
cause acquisition of one or more selected components corresponding to a selected one of the selection targets via a broadcast network or a communication network,
the plurality of components managed by the control information is associated with a component hierarchy structure including a first hierarchy level, a second hierarchy level, and a third hierarchy level for each component category,
the third hierarchy level is for adaptively selecting an adaptive component from a subset of the plurality of components according to the control information,
the second hierarchy level is for synthesizing the adaptive component which is adaptively selected in the third hierarchy level and a first component which is not included in the third hierarchy level into a synthesized component according to the control information, and
the first hierarchy level is for selecting a selective component from the synthesized component, the adaptive component, or a second component which is not included in the second hierarchy level and the third hierarchy level according to the control information.

\* \* \* \* \*